INVENTORS
H. A. HENNING
E. JACOBITTI
B. F. LEWIS
BY William F. Simpson
ATTORNEY

INVENTORS H. A. HENNING
E. JACOBITTI
B. F. LEWIS
BY William F. Simpson
ATTORNEY

INVENTORS H. A. HENNING
E. JACOBITTI
B. F. LEWIS

ATTORNEY

INVENTORS H. A. HENNING
E. JACOBITTI
B. F. LEWIS
BY William F. Simpson
ATTORNEY

INVENTORS H. A. HENNING
E. JACOBITTI
B. F. LEWIS
BY
William F. Simpson
ATTORNEY

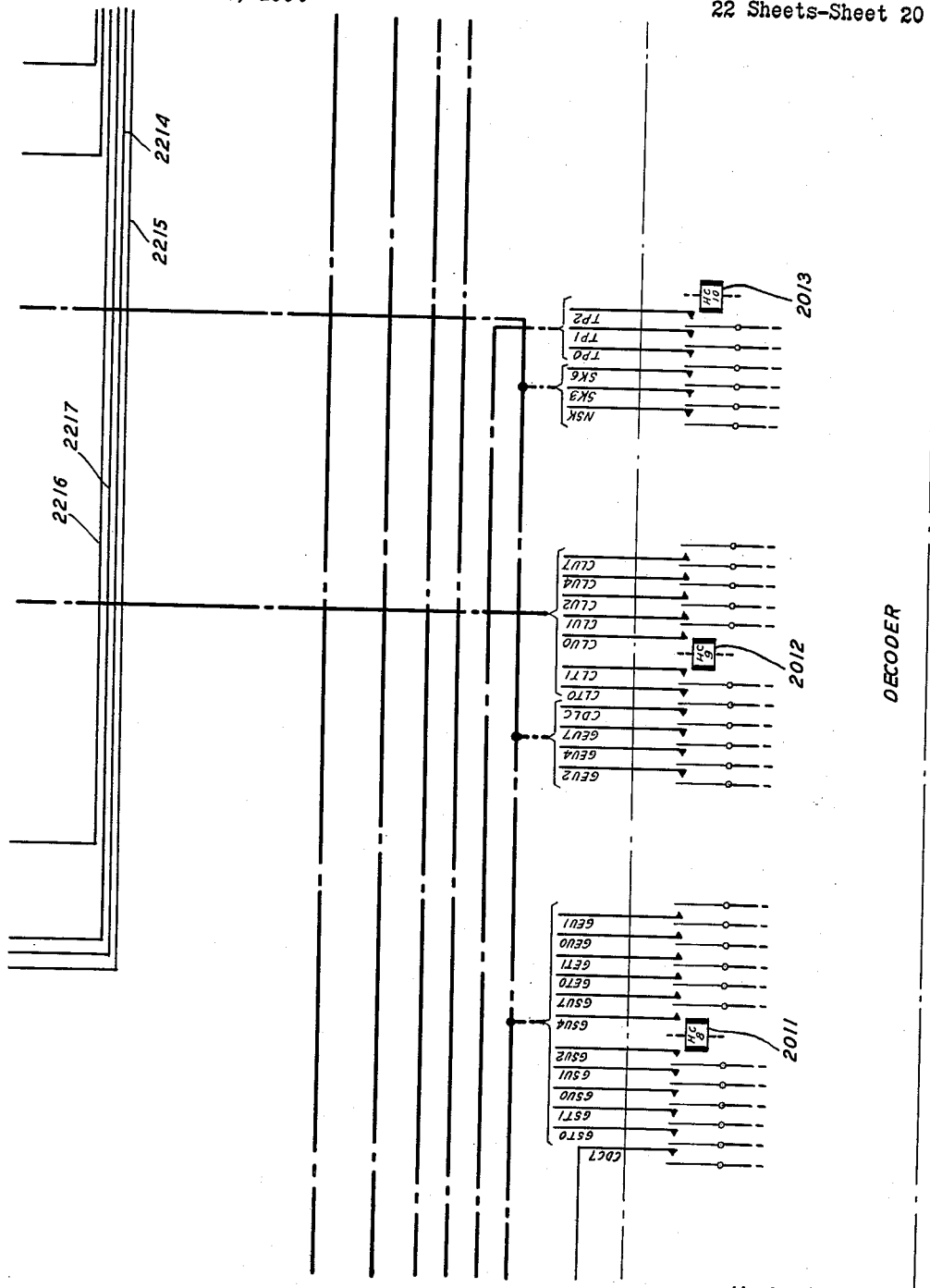

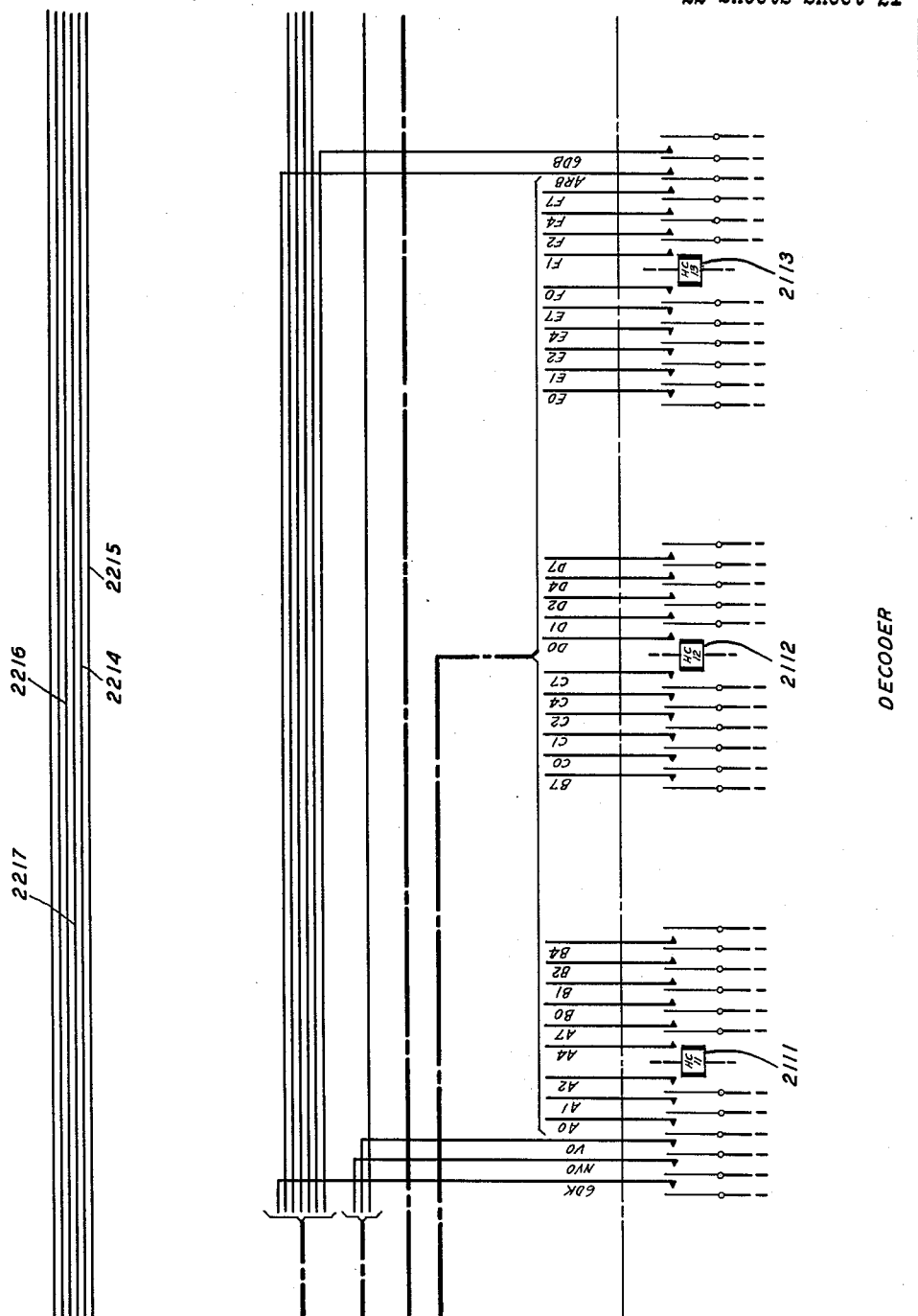

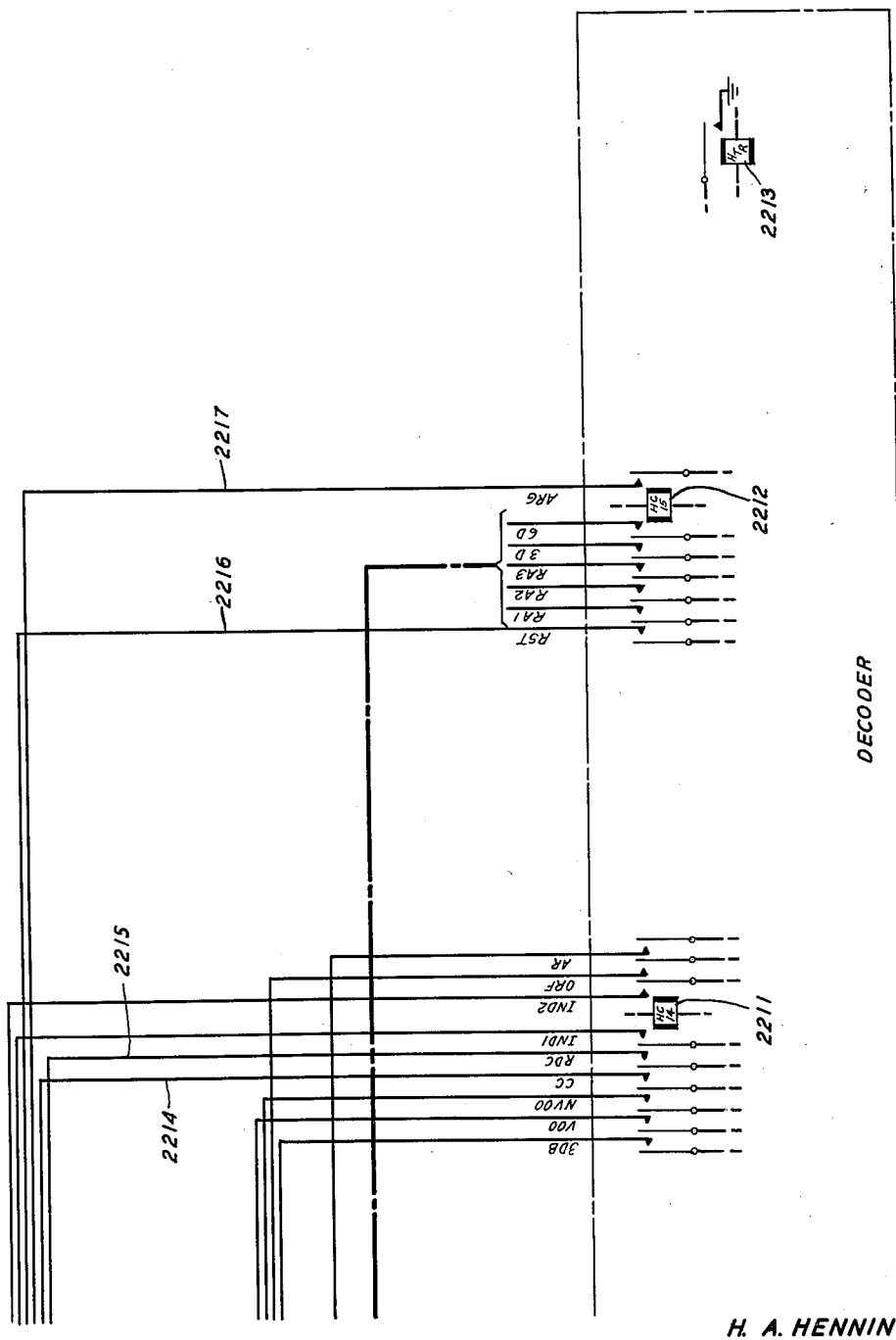

United States Patent Office 3,011,029
Patented Nov. 28, 1961

3,011,029
MAGNETIC DRUM TRANSLATOR FOR AUTO-
MATIC TOLL SWITCHING CENTER
Harley A. Henning, Millington, and Edward Jacobitti,
Newark, N.J., and Benjamin F. Lewis, Bayside, N.Y.,
assignors to Bell Telephone Laboratories, Incorporated,
New York, N.Y., a corporation of New York
Filed Mar. 25, 1954, Ser. No. 418,508
14 Claims. (Cl. 179—18)

This invention relates to telephone switching systems and more particularly to dial or key set controlled systems to enable the establishment of toll connections a nation-wide or international basis.

More particularly, this invention relates to improved methods, circuits and apparatus for providing translations of the controlling signals employed in such systems. A typical telephone switching system of this type is disclosed in United States patent application of Gooderham-Jacobitti-Myers-Shipley-Strickler Serial No. 286,267 filed May 6, 1952 now U.S. Patent 2,868,884, granted January 13, 1959.

In large comprehensive switching systems providing automatic switching of communication paths on a national or international basis the number of telephone subscribers' stations and other stations involved far exceeds the number of possible codes or station identification numbers and codes assigned and employed in the various local switching areas of such a large system. Consequently, stations in various ones of the areas may all have the same number or other identifying codes. As a result, when it is desired to incorporate all of the various switching areas of a nation in a comprehensive switching system, it is necessary to add additional codes or other identification numbers or symbols to the existing subscriber's station identification in order to uniquely identify each one of the various stations. As described in the above-identified copending application, the territory, nation, or nations are divided into smaller areas, the size of the areas generally depending upon the number of telephone stations in the area, and each area assigned an area code. When it is desired to call these stations over such a network the area code must accompany the subscriber's station identification and is usually transmitted ahead of the subscriber's station identification. The area code may be transmitted by a toll operator when a toll operator handles the call in which case she will usually employ a key set, but may employ a dial and transmit first the area code, then the usual office code and finally, the subscriber's number within the office. Alternatively, when the subscribers are provided with suitable facilities at their local switching station, they may directly dial the distant subscriber's station. In this case, a subscriber must first dial the area code of the called station followed by the office code and the subscriber's number.

In such systems, a number of problems must be solved because for such a call a communication path must be frequently built up through a large number of switching points. Furthermore, the number of switching points through which calls extend may vary from a small number to a relatively large number. At each of these switching points, the same area code and office code must be used over again or else some other codes substituted for them and used repeatedly. Furthermore, the selections made at each of the switching systems will generally be different because the traffic conditions and numbers of switches and stages of switches at various points may be varied. Furthermore, it is highly desirable to permit a universal directory to be published in which the number dialed or transmitted from a key set will be the same no matter where the calling party is located so long as he is calling the same called station. In addition, different numbers of symbols or digits are employed in different areas to designated offices and subscribers' numbers so that the dialed numbers cannot be generally employed directly to control the selection of paths in the automatic switching equipment at the various switching centers. Furthermore, the signaling methods employed in different areas are different so that the equipment must be arranged to employ the proper type of signals in the various areas.

In order to satisfactorily solve these various problems as well as other related problems, a card translator has been incorporated into the system described in the above-identified copending application.

At each of the respective switching centers, the cards are selected by the dialed signals and are employed to control the switching equipment and thus the establishment of switching paths at the respective switching centers. As disclosed in the above-identified copending application, a large number of such translators are required at the switching stations and each employs a relatively large number of cards which must be changed in order to change the translations. Furthermore, moving and selecting one of a large plurality of of relatively heavy cards requires large and relatively heavy equipment which of necessity must be relatively slow in operating.

In order to overcome the above and other difficulties a magnetic drum translator arrangement is provided in accordance with the present invention, which translator is designed to be substituted either individually for each of the card translators or for a group of the card translators of the type disclosed in the above-identified application.

In accordance with this invention information relating to the different translations is stored in the magnetic surface of a magnetic drum by magnetizing small areas of the drum in one or another of a plurality of different manners.

An exemplary drum translator in accordance with this invention is arranged to employ a rotating magnetic drum as the only mechanical movable element and is designed to be fast in operation thus reducing the holding time of the equipment and at the same time improving the speed of service.

A feature of the invention relates to the use of a magnetic drum on which information may be stored on a permanent basis and yet readily changed when it is so desired to change the routing of calls through any switching center.

Each translation item comprises at least two portions, namely, the address or directory code number of the called station area office code or other portions of the called station identification. The other information of each translation item must include the necessary switching information for properly routing such a call through the respective switching center at which the magnetic drum is located.

Another feature of this invention relates to providing still another control area individual for each of the translation items which area is provided to facilitate the canceling, the adding or changing of translations.

A further feature of this invention relates to input circuits for receiving input dial station designations and checking the reception of all of the elements of such designations required to identify one of the existing translations and then comparing the input information with the registered address information on the drum. The circuits operate sufficiently fast to check each of the addresses as the drum rotates and upon the coincidence of the address signal stored in the drum and the input information the circuits and equipment respond to and deliver the corresponding output translated information.

In the above-identified copending application, the system is arranged so that a card may be selected in response to three digits comprising the area code of the called station or subscriber or a card may be selected in response to six digits, namely, the area code plus the office code of the called station or subscriber.

An object of the present invention is to provide a magnetic translator employing a continuously rotating magnetic drum which is arranged to deliver translations from either three or six digits of input information.

If the routing of a call over the next trunk terminates in a switching control point within the area of the called station, the area code is discarded and not transmitted. Instead, only the office code and subscriber's number are transmitted. If the trunk selected terminates in another switching office in some other area, then the entire calling station designation including the area code as well as the office code and subscriber's number must also be transmitted.

A feature of this invention relates to improved circuits, apparatus and methods for controlling the number of signals transmitted from any switching point to the succeeding switching point.

In large comprehensive switching systems, different areas employ different types of supervisory and directing or calling signals for controlling the switching equipment.

In accordance with the present invention, improved circuits, methods and apparatus employing a magnetic storage drum device are employed to control the type of signals transmitted from any switching center independently of the type of signals received by that switching center. The signals transmitted are of the type employed either at the next switching center for the control of the switching equipment thereat or of the type employed to control the equipment in the local area of the called subscriber's station.

Another feature of the invention pertains to utilization of a magnetic drum having facilities for recording and furnishing a large variety of information including all the types required and provided by the card translator including the cards with the holes therein described in the above-identified copending application. Such a translation item may furnish the following information in addition to the various recorded information necessary to select each item which additional information includes the following:

(a) That three digits are not sufficient for a requested translation and that a second translation may be requested when four, five or six digits, as the case may be, become available;

(b) That in an office with a plurality of switching trains to identify and seize a marker or other common control circuits connectable to the proper switching train;

(c) For control of traffic meters and other charging information;

(d) That in area code translation items, the proper translator numbers or address identifications of individual translation items are found;

(e) To indicate the type of signaling required on an outgoing trunk group to be selected by the switching equipment;

(f) To send or not to send forward the area code registered or to supply an area code when none is registered;

(g) To indicate the order of choosing possible alternative groups;

(h) To indicate disposition of calls when no circuits are available on any route;

(i) To replace code digits on calls routed to step-by-step toll centers with other digits and to send forward one, two or three digits on a dial pulse basis as required in step-by-step areas;

(j) To control the skipping or discarding of any of the required digits;

(k) To identify the location of test leads for trunk groups over which a call will be routed; to pick alternate routes in case all of the trunks of the selected route are busy;

(l) To indicate the class of service and other rate information if desired when necessary.

Another feature of the invention relates to suitable interconnecting circuits and means for properly connecting the drum translators with decoders and other switching equipment at a switching center. Other features of this invention relate to interconnect arrangements which permit the substitution of a magnetic drum translator in accordance with this invention for the card controlled translators of the switching systems of the type disclosed in the above-identified copending application, without material alteration of the other switching circuits of said system.

A feature of this invention relates to control codes accompanying each translation item stored on the drum to readily control the recording or storing of translation items in the drum.

Another feature of this invention relates to incorporating control codes with each translation item to render the item available for translation.

Another feature of this invention relates to control codes for rendering the translation item unavailable for translation without in any way changing the address or identifying portion or the output or translation portion of a translation item.

Another feature of the invention relates to control and indicating circuits for controlling the recording and changing of recording of the items of information in a translation item and indicating when the information has been stored or changed in the drum.

A further feature of this invention is to employ information previously stored in the drum to control the changing of the information during the time the area of the drum in which the information is stored makes a single pass under the combined pickup and recording coil.

Another feature of this invention relates to control circuits for selectively connecting a control and test position and equipment to any of a plurality of tranlator drums and related circuits and equipment.

Another feature of this invention is to interconnect the writing or recording amplifiers with the writing windings or circuits of the writing coil through an electromagnetic transformer.

The foregoing and other objects and features of this invention may be more readily understood from the following description of an exemplary embodiment thereof when read with reference to the attached drawing in which.

Figure 3:
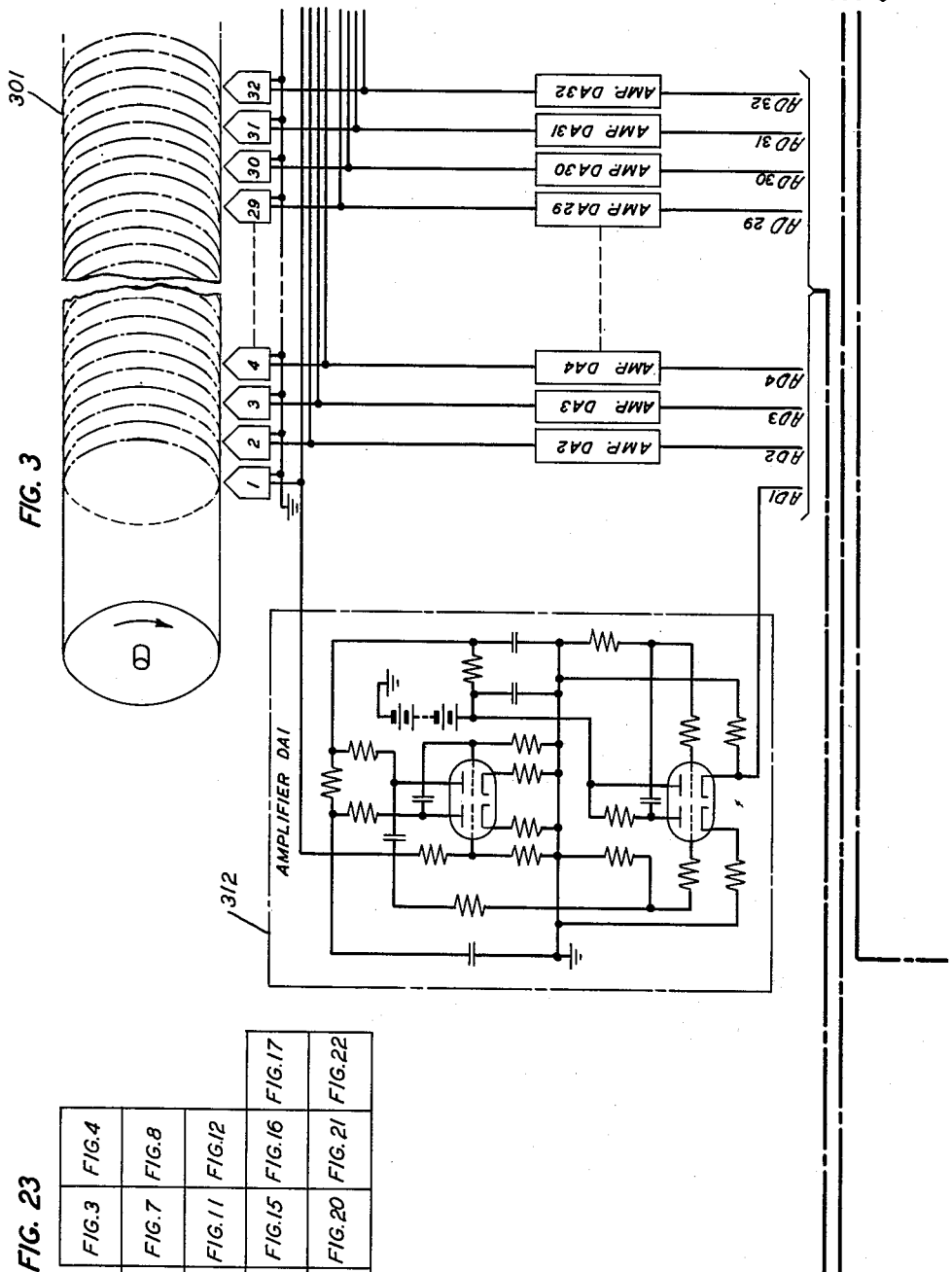
Figure 4:
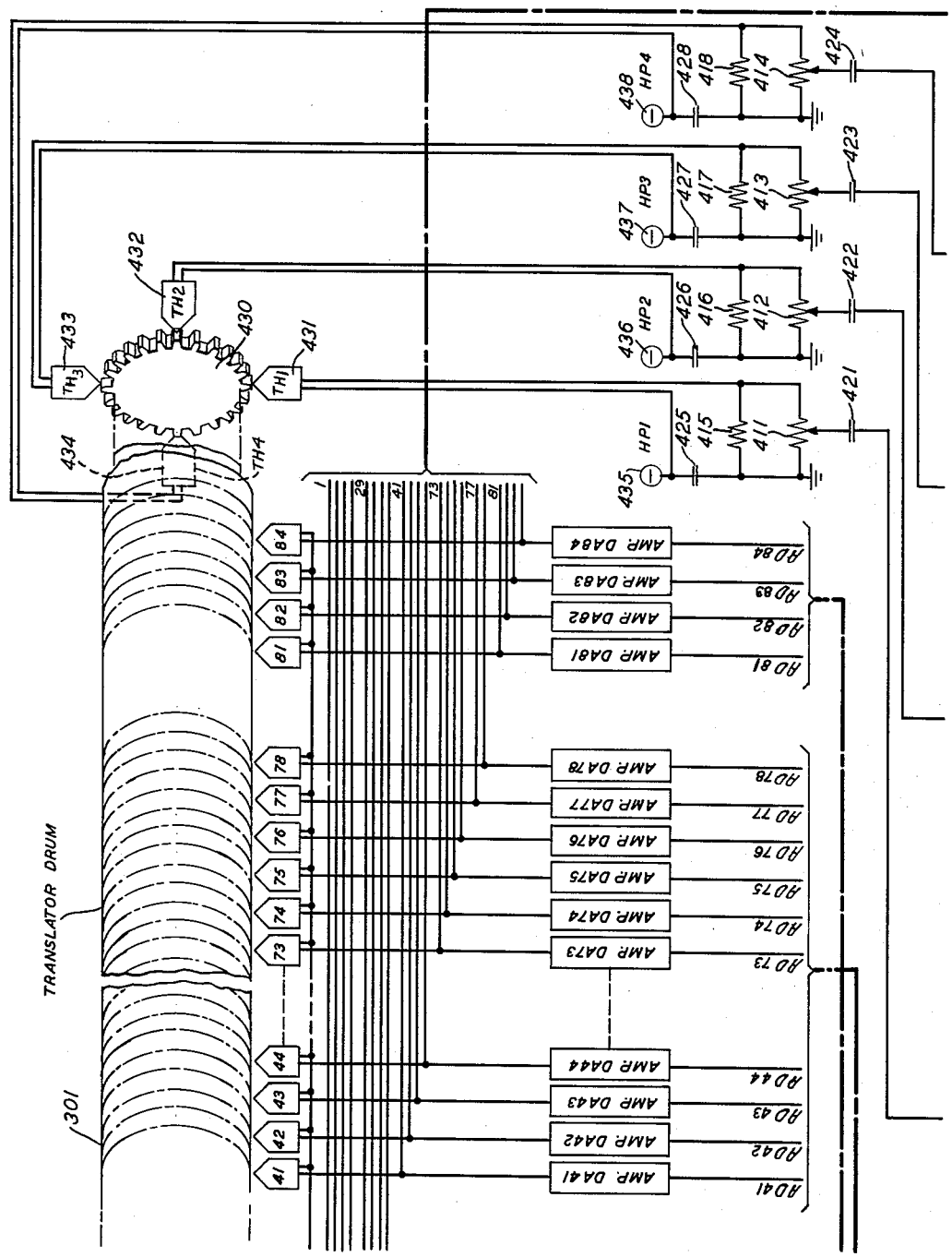
Figure 5:
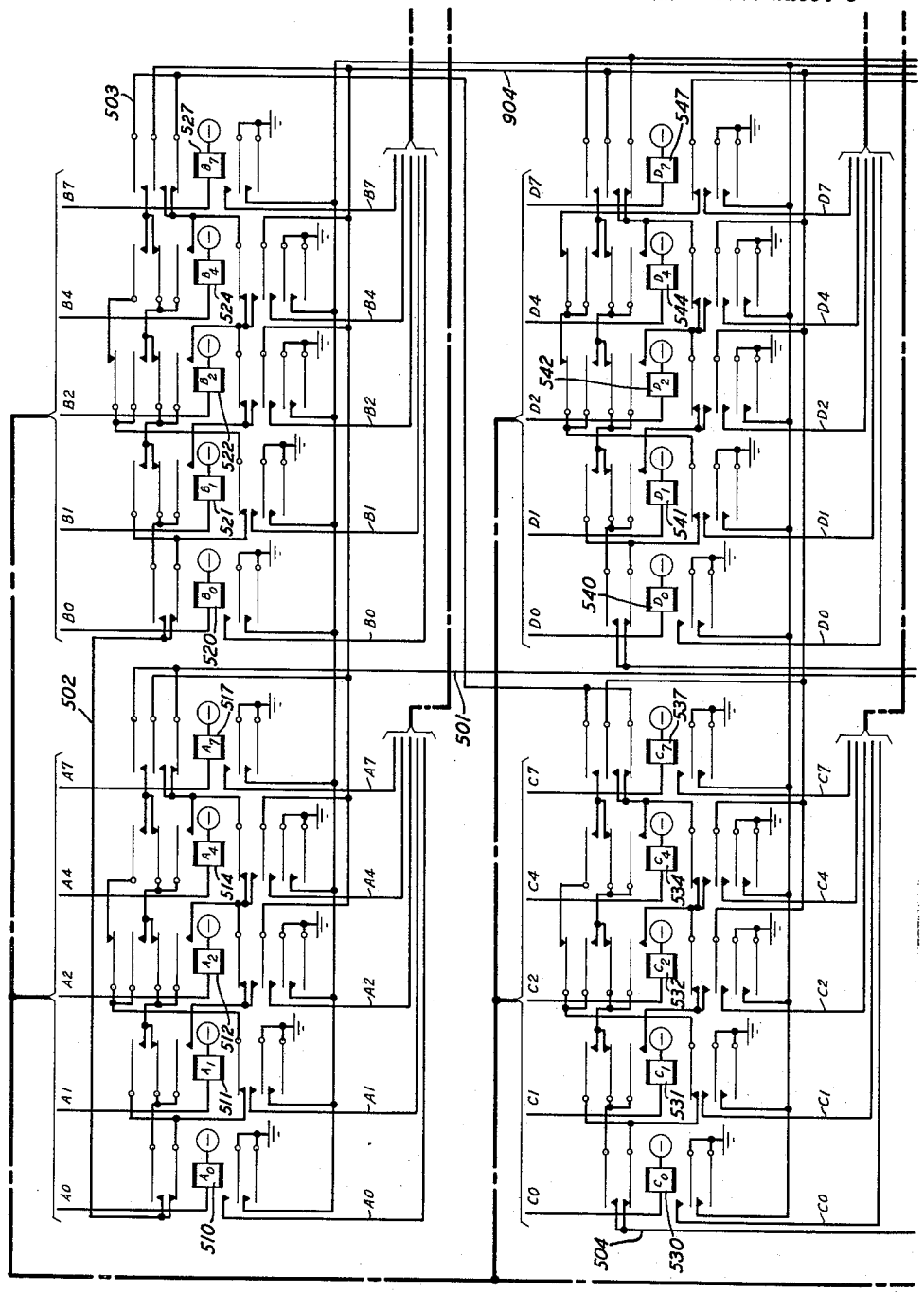
Figure 6:
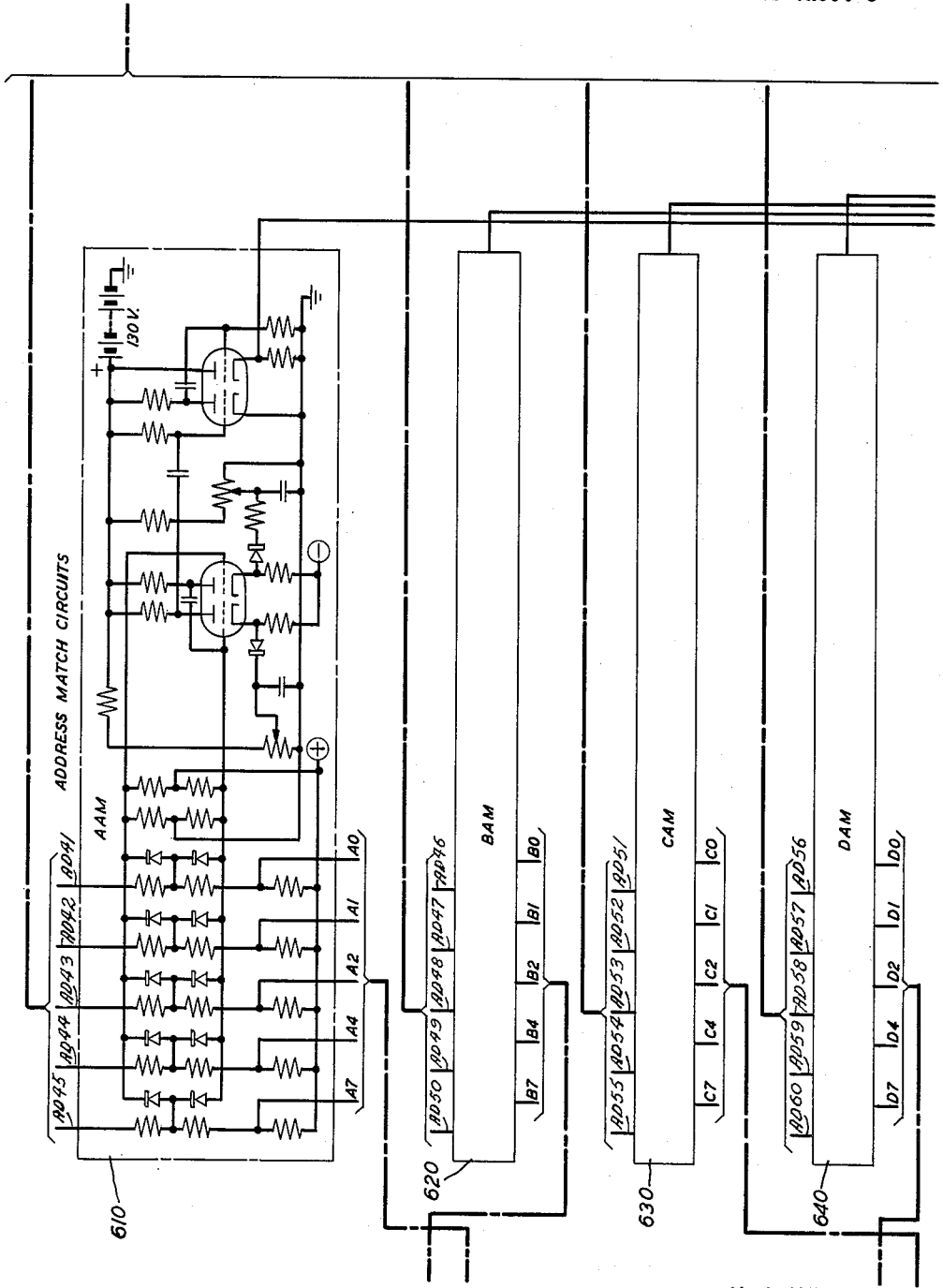
Figure 7:
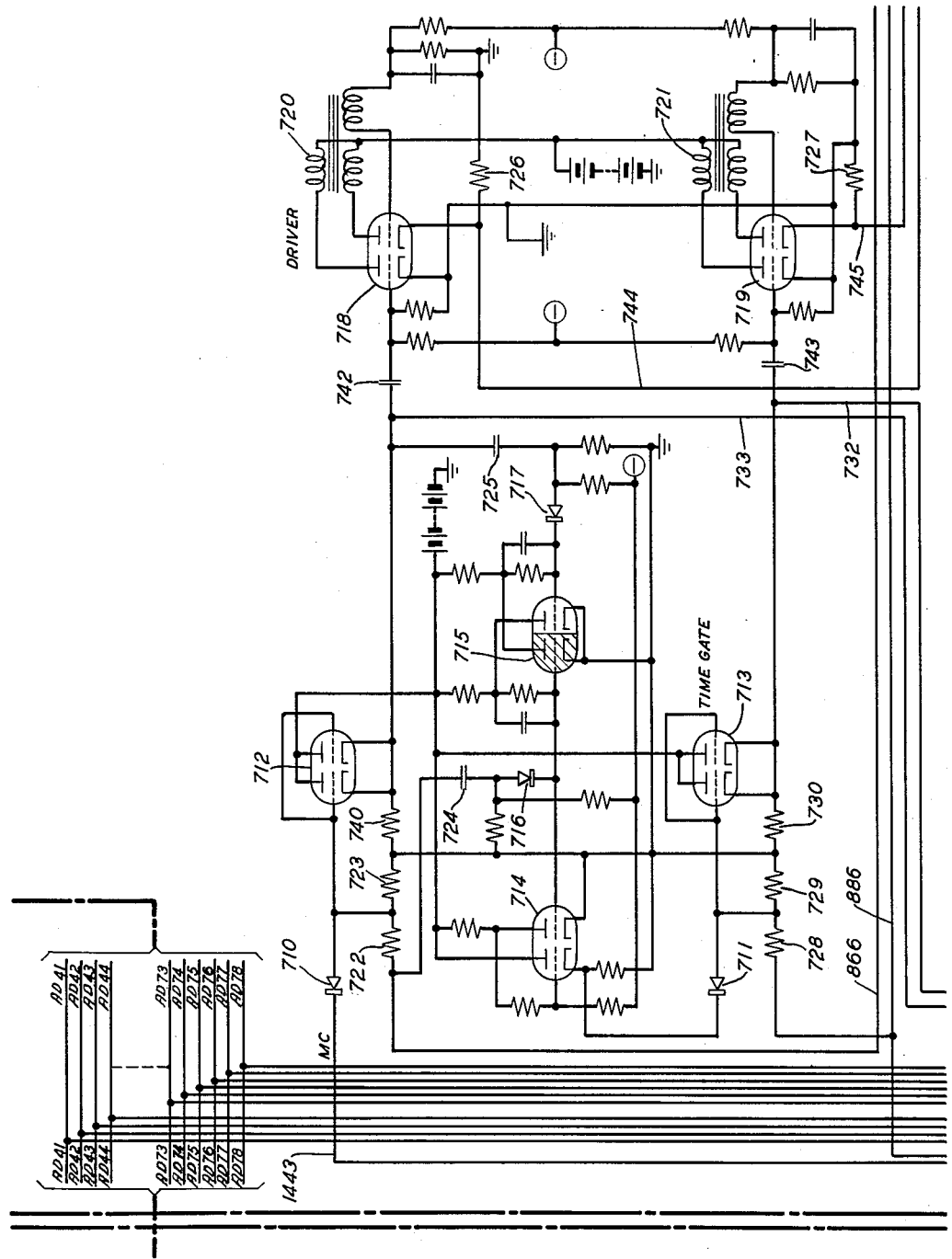
Figure 8:
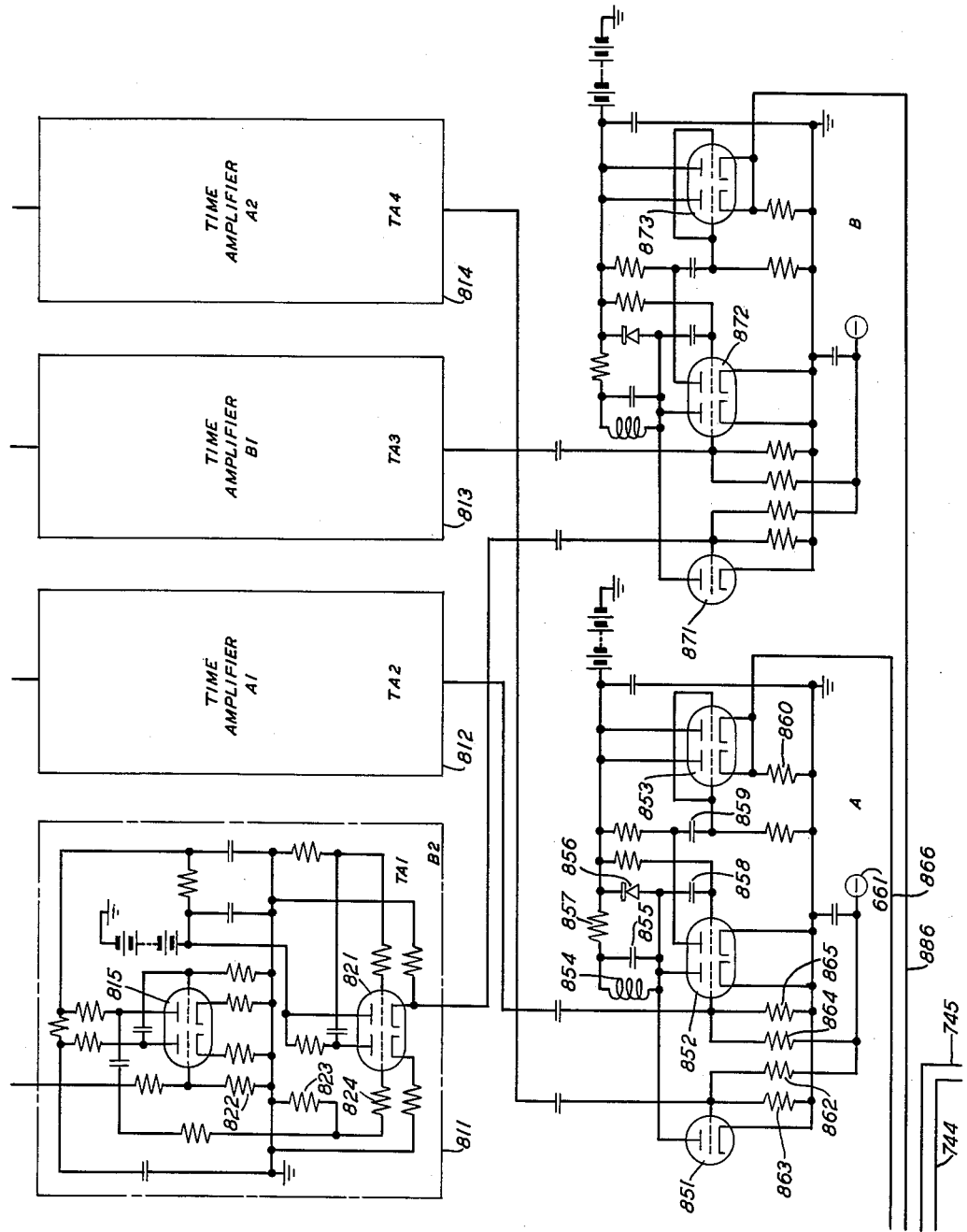
Figure 9:
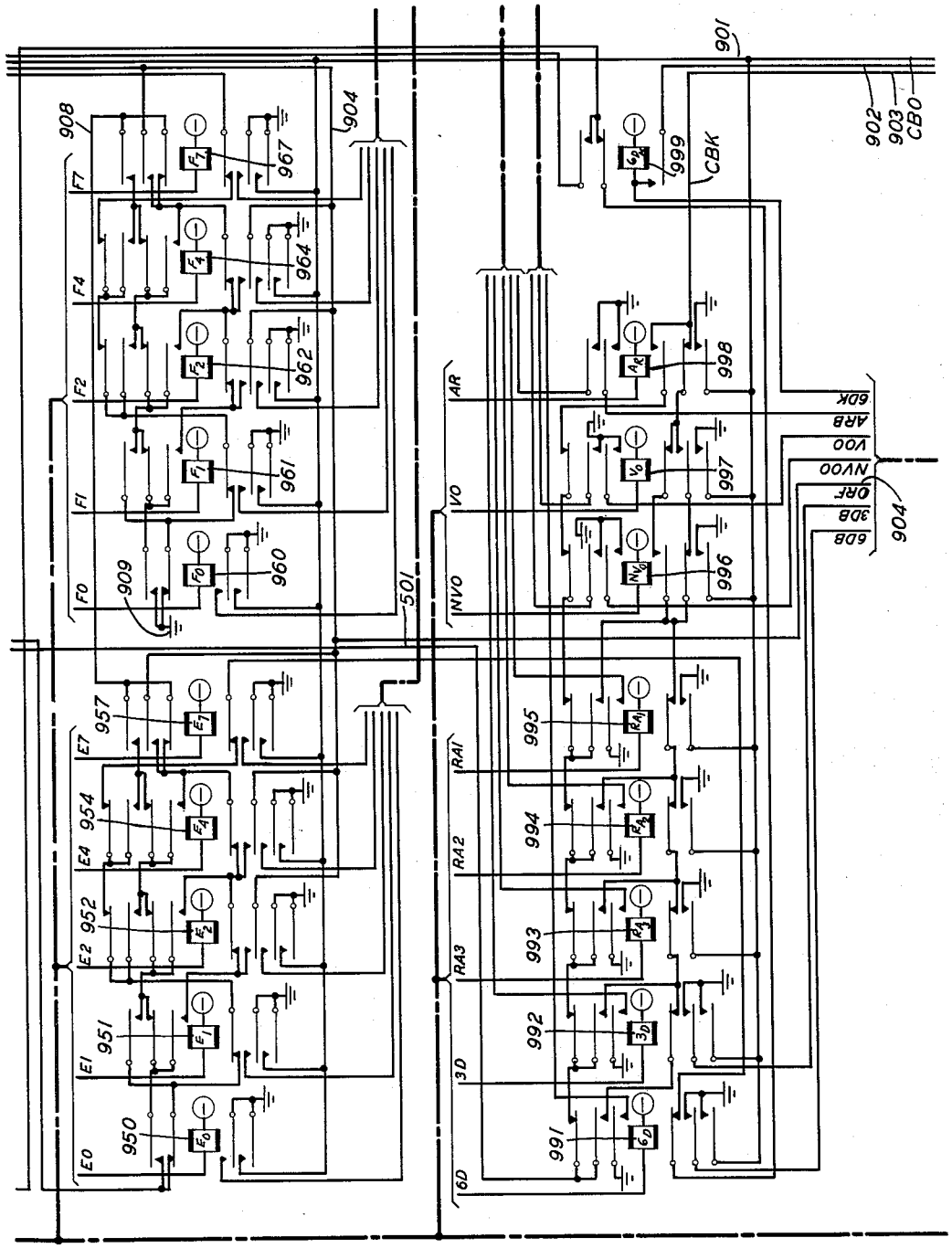
Figure 10:
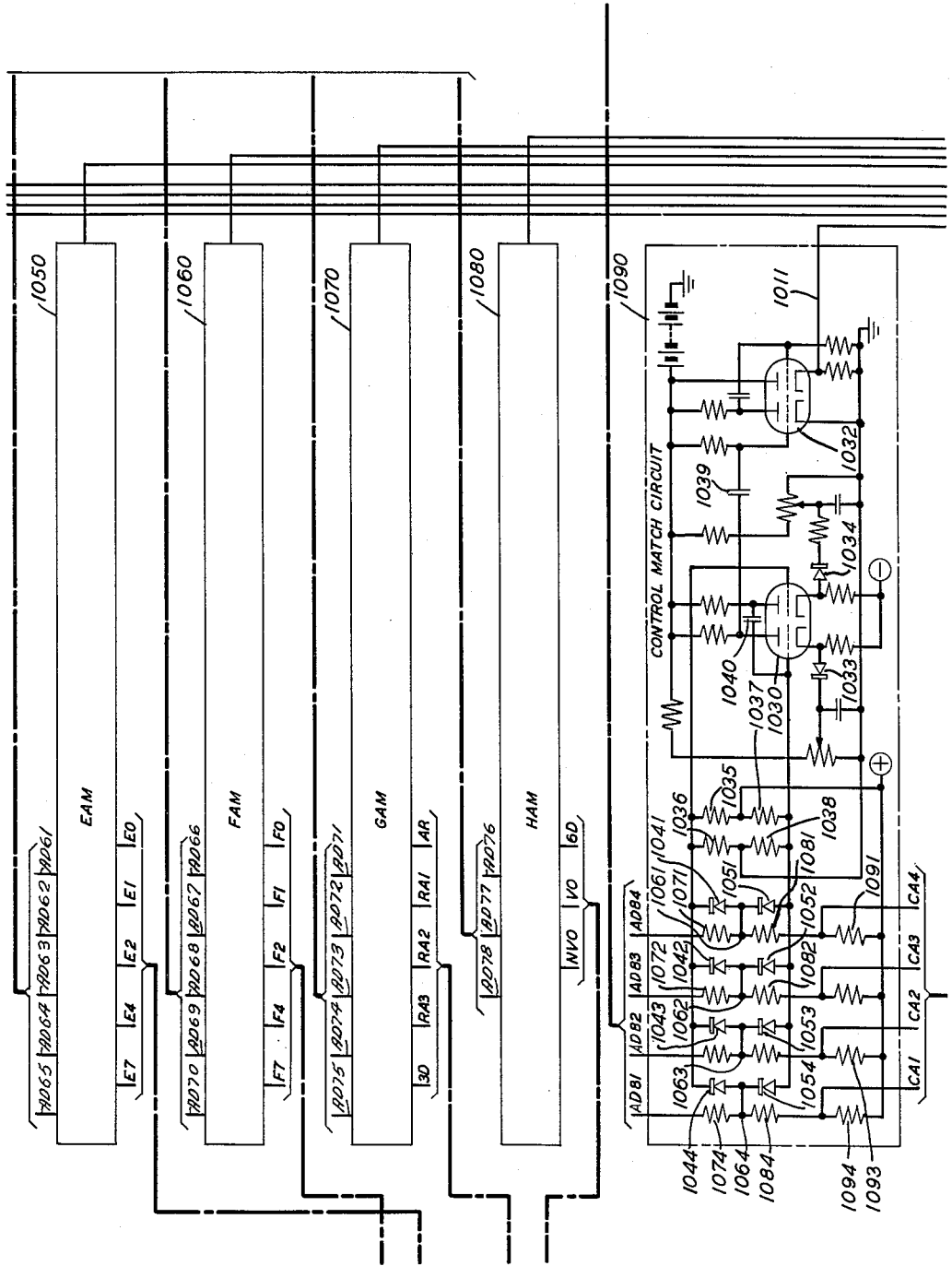
Figure 11:
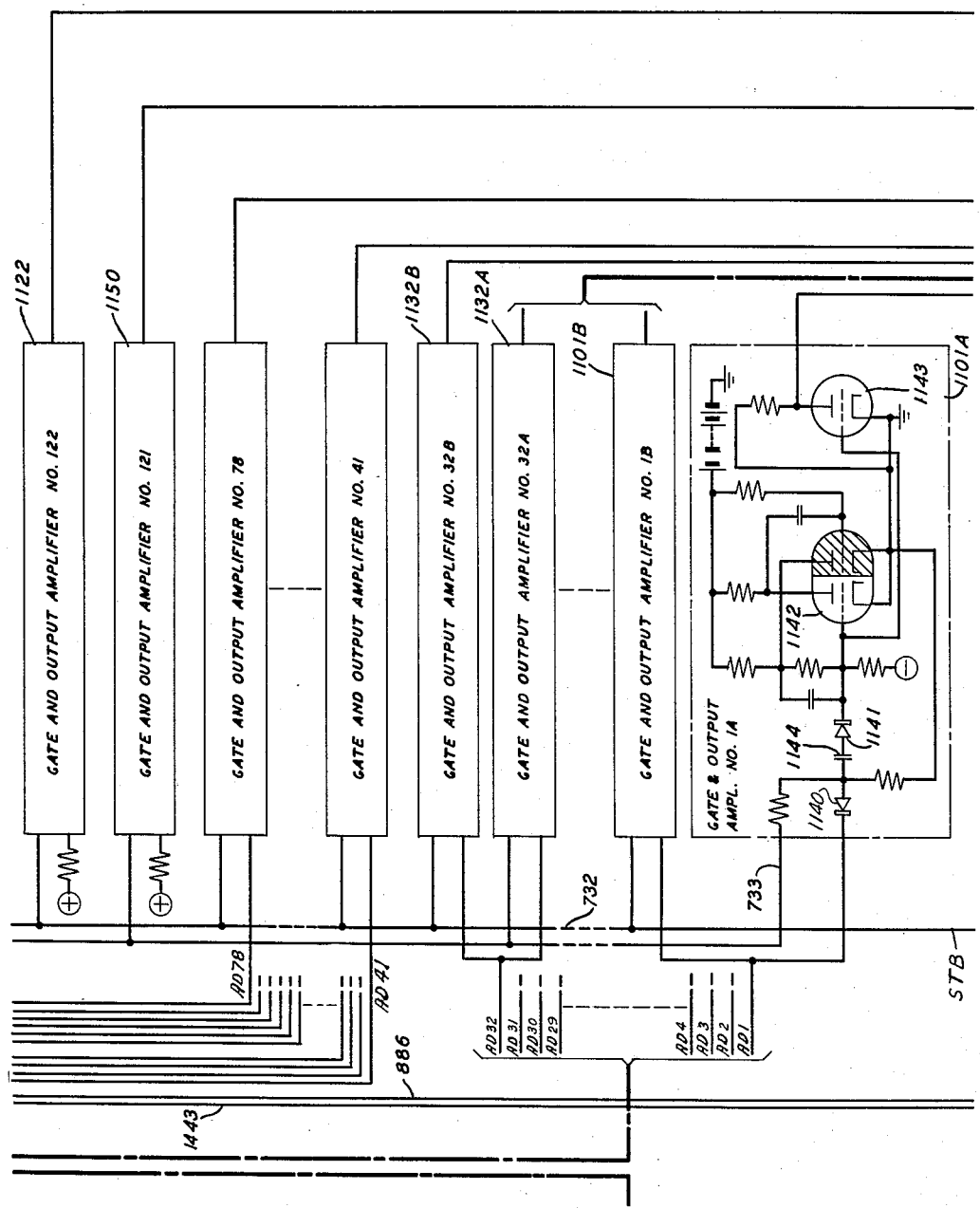
Figure 12:
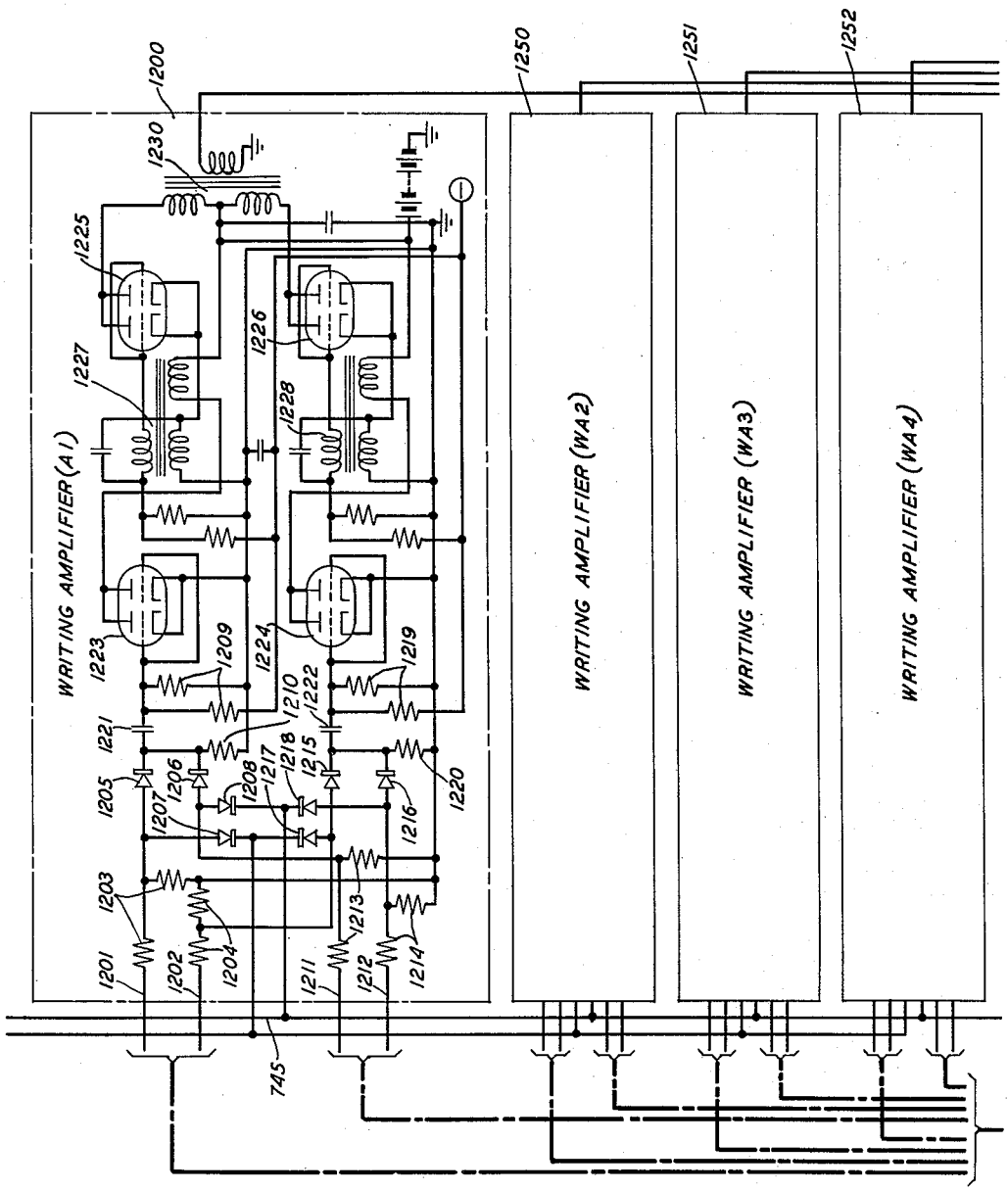
Figure 13:
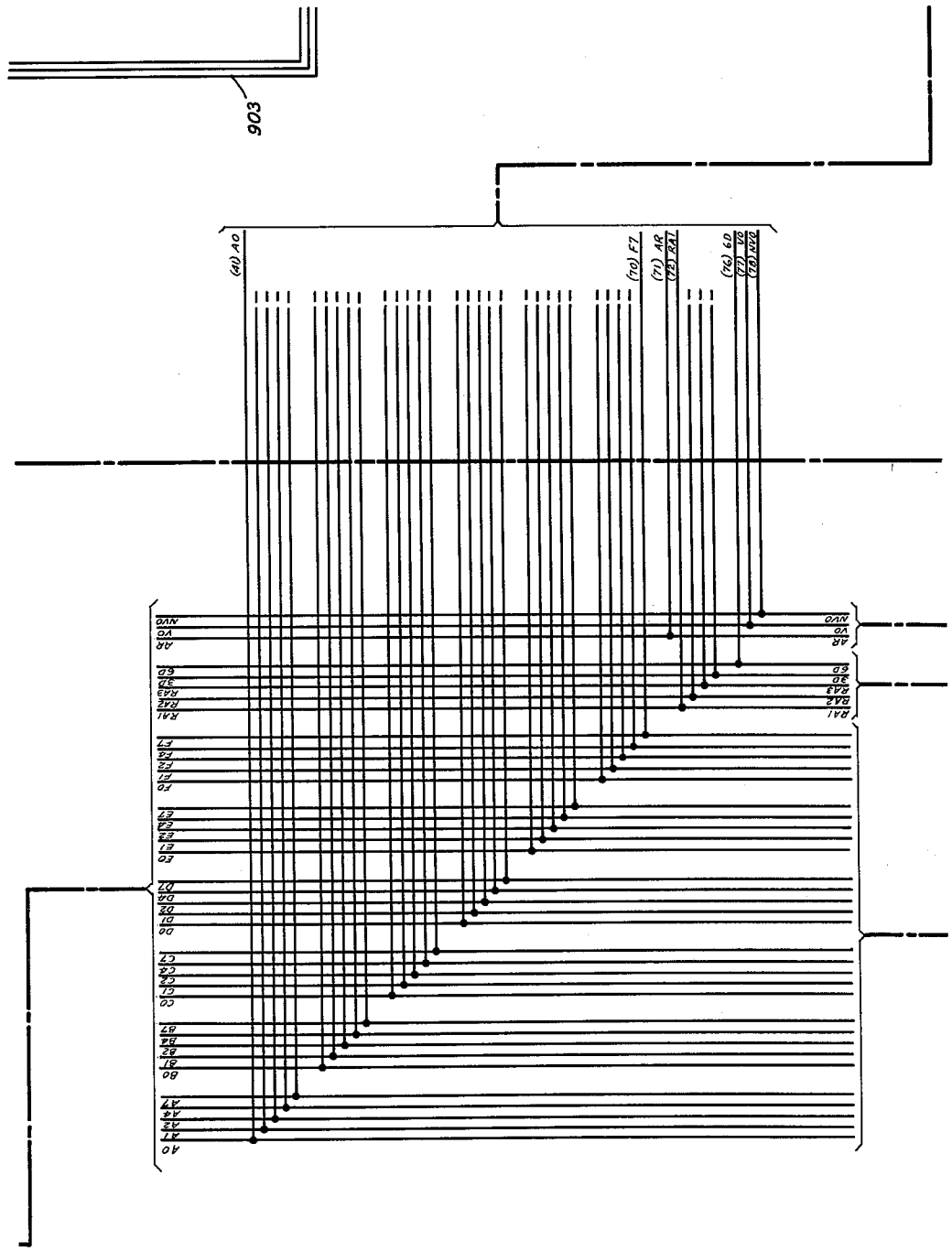
Figure 14:
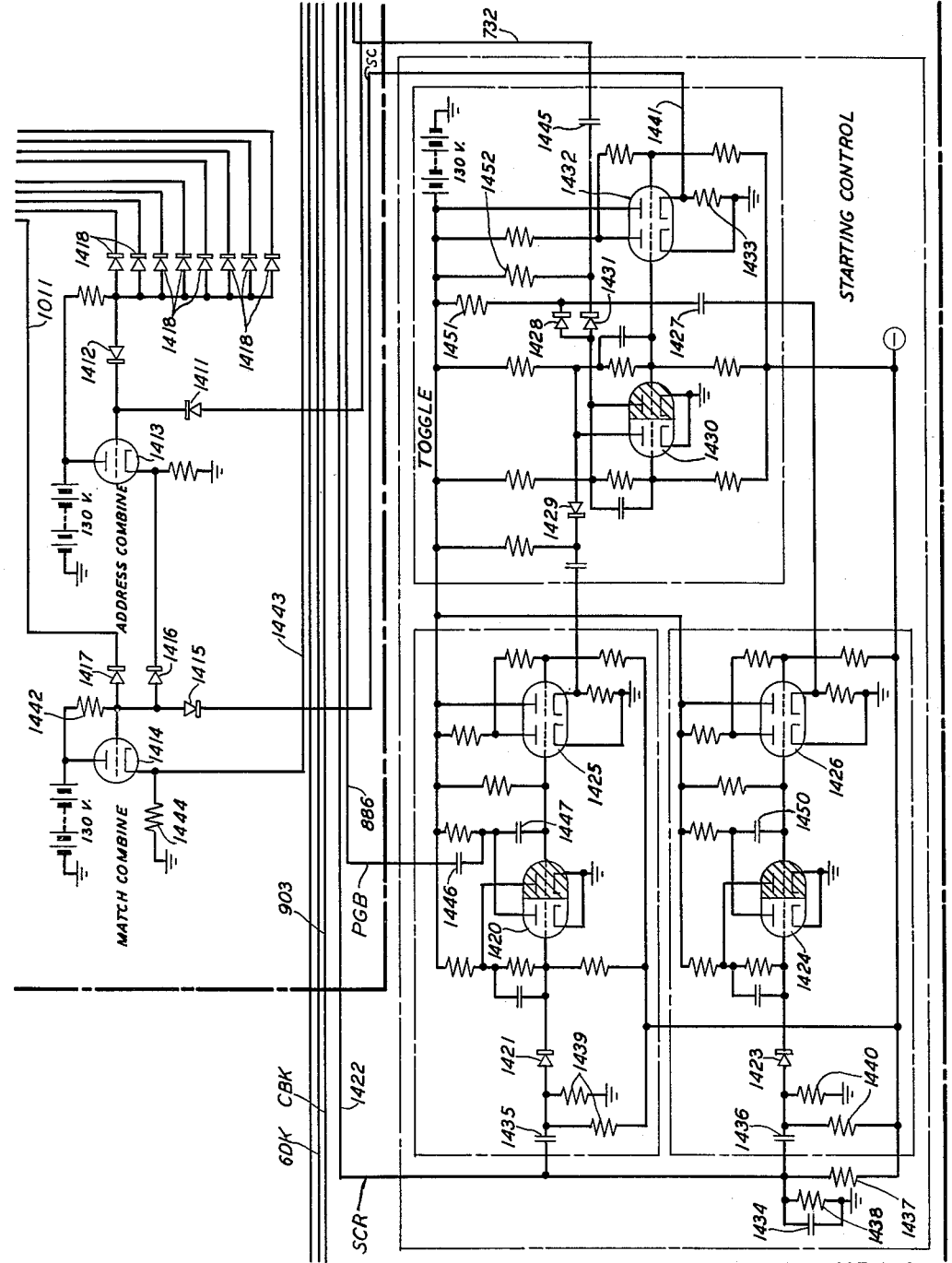
Figure 15:
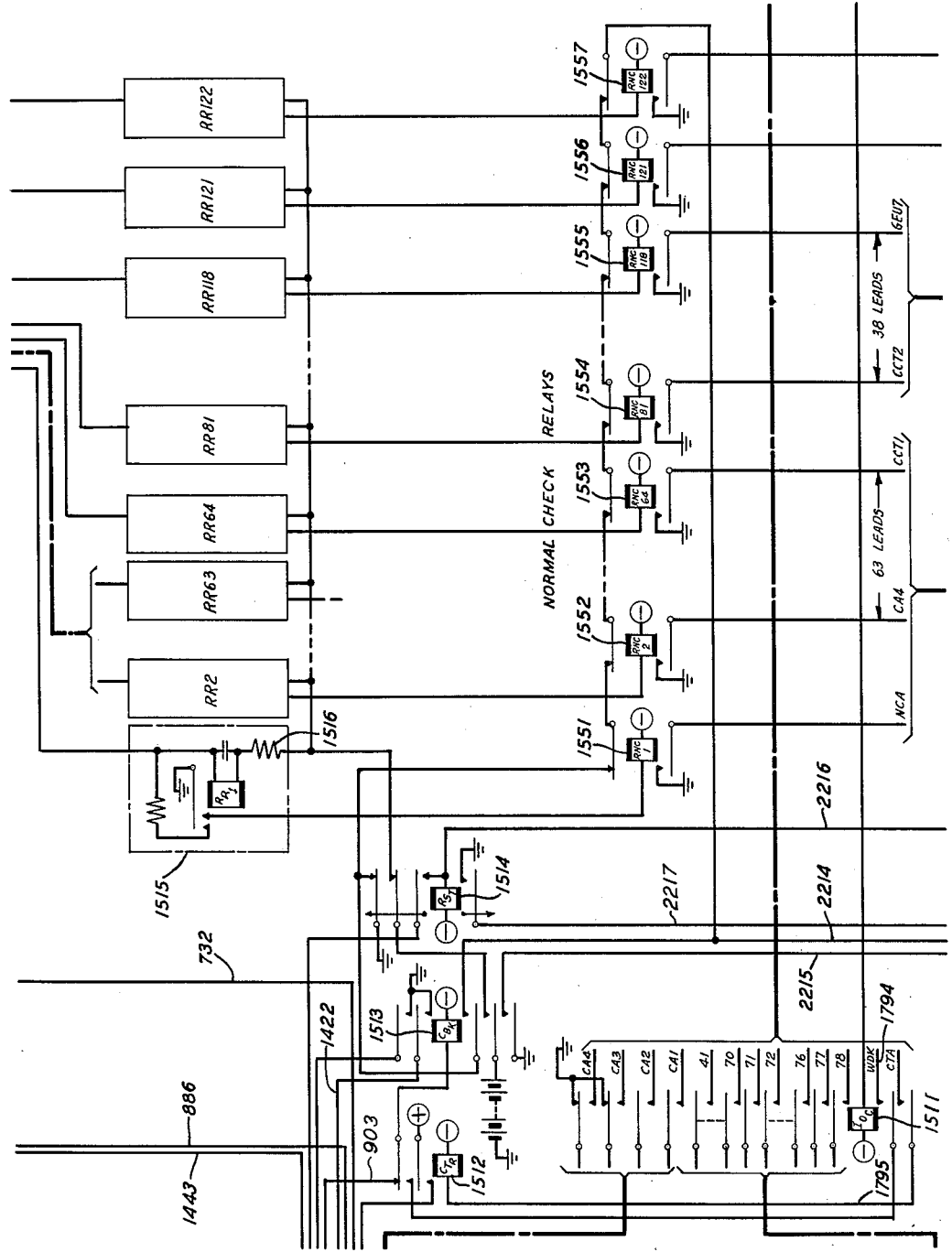
Figure 16:
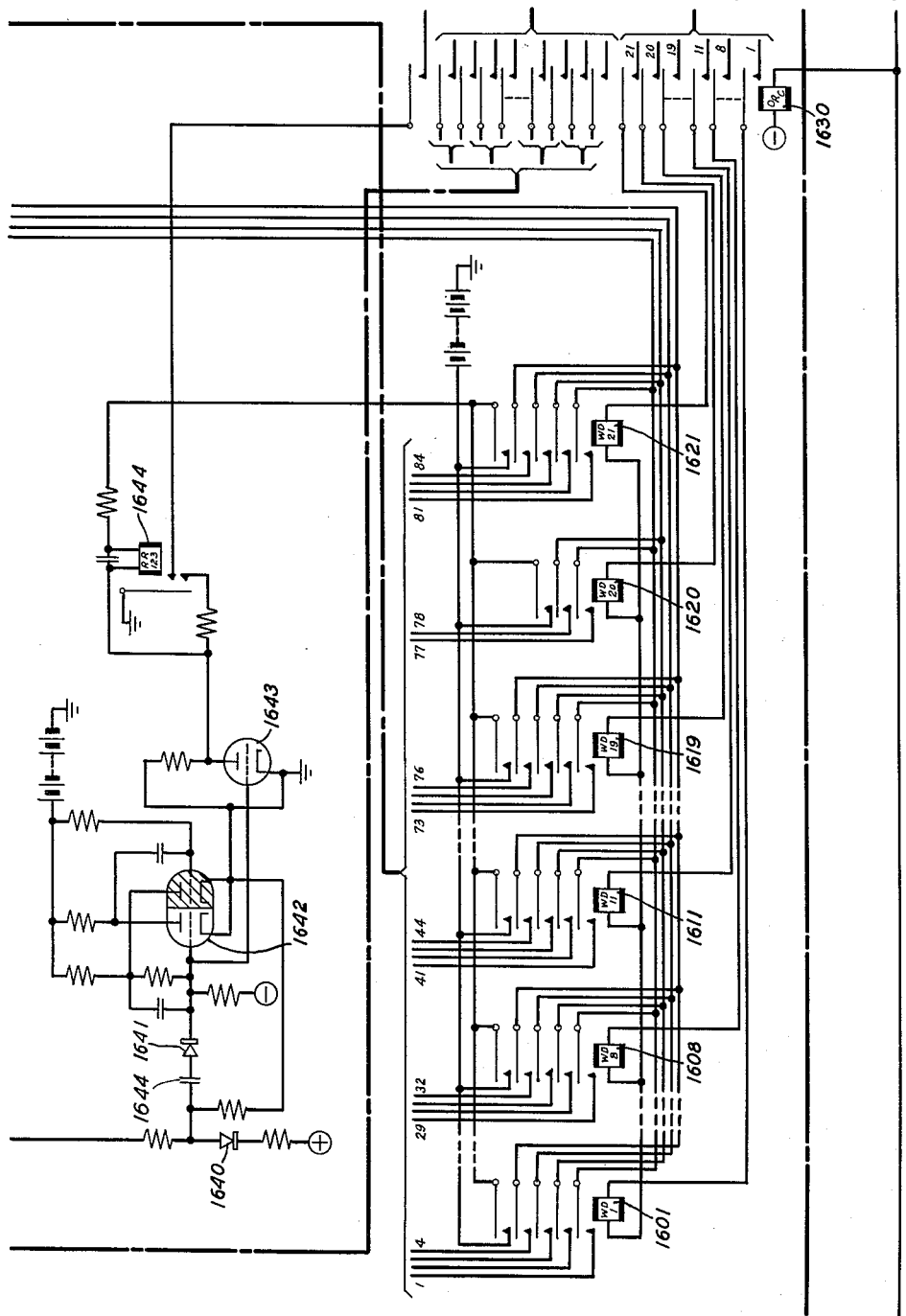
Figure 17:
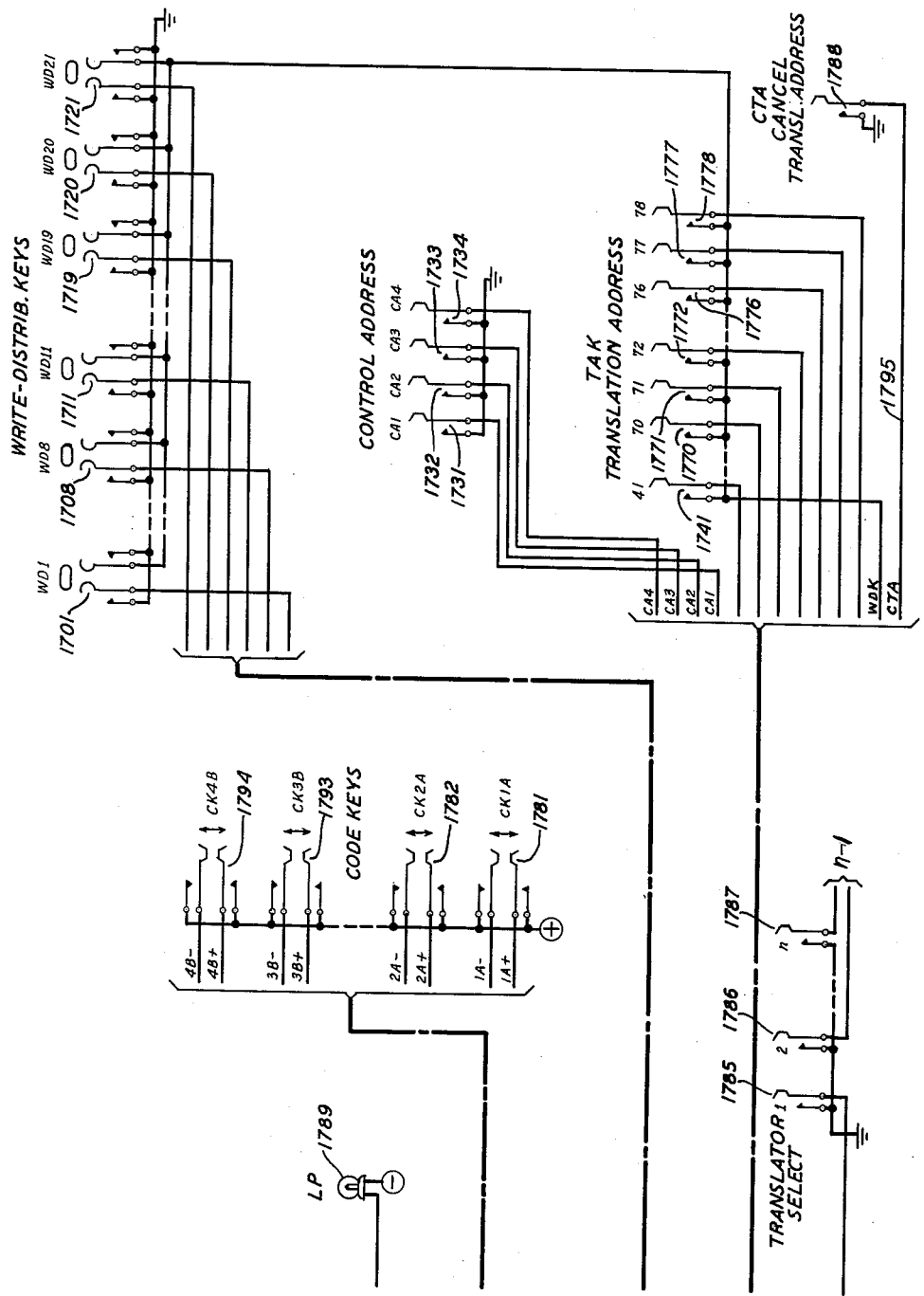
Figure 18:
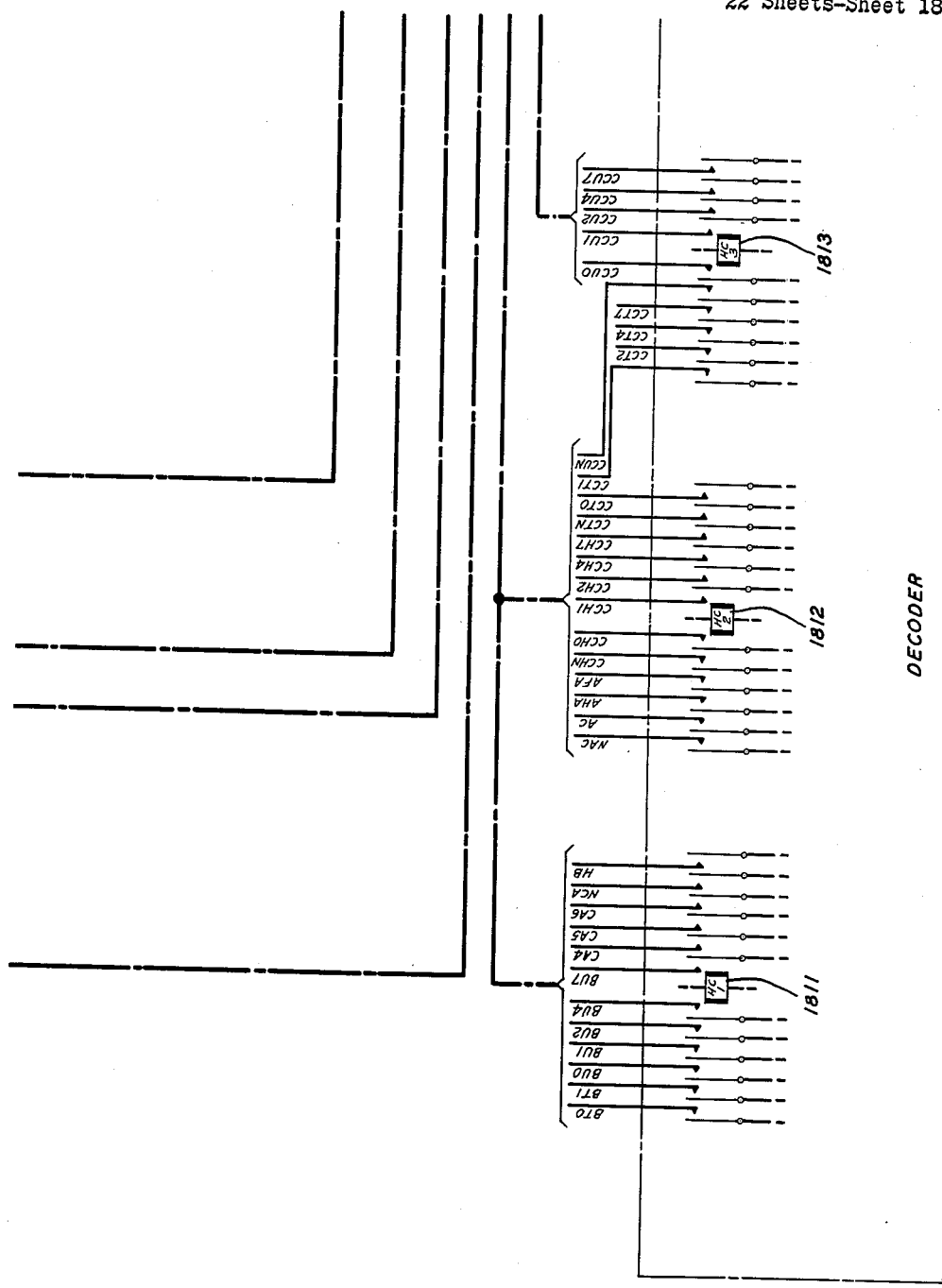
Figure 19:
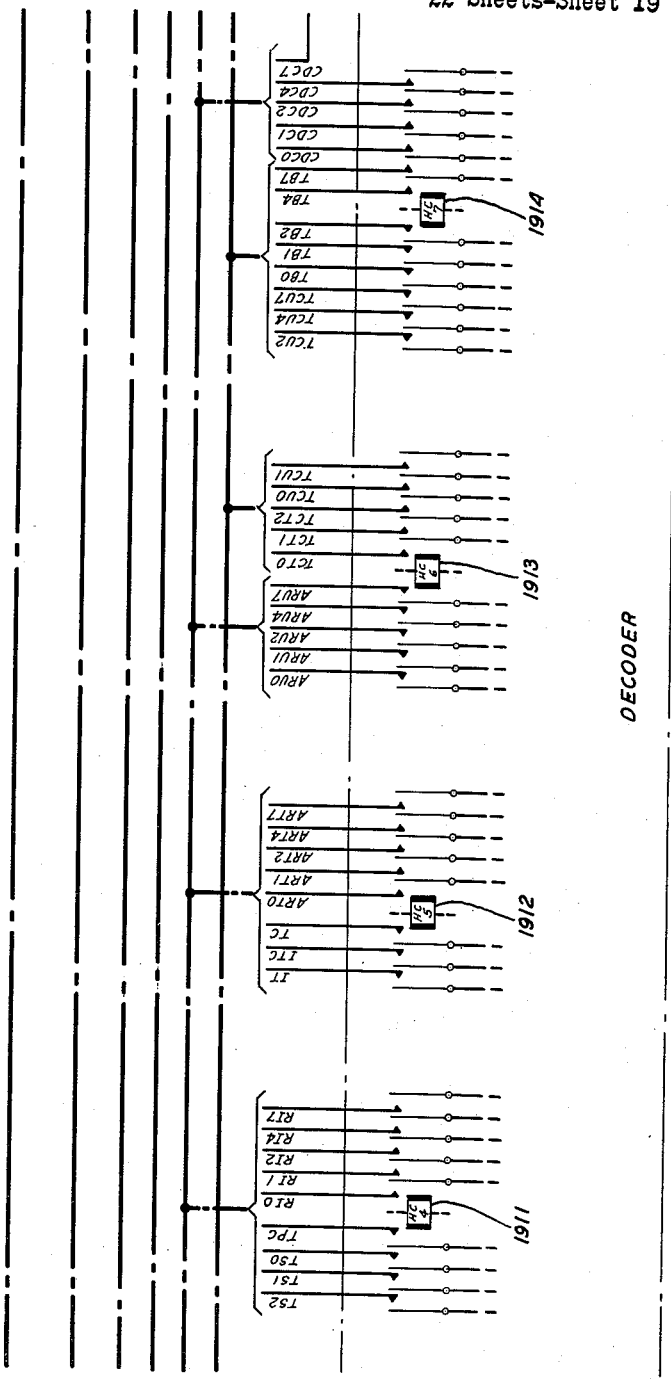

FIGS. 3 through 22, inclusive, when arranged as shown in FIG. 23 show detailed circuits and apparatus of an exemplary translator embodying the present invention;

FIG. 3 shows a portion of the magnetic drum, pickup and recording devices and certain of the amplifiers associated therewith;

FIG. 4 shows another portion of the magnetic drum and pickup and recording devices and amplifiers associated therewith and also the timing pickups in the timing wheel associated therewith;

FIG. 5 shows a portion of the circuits and apparatus for recording incoming codes or addresses of translation items;

FIG. 6 shows a portion of the matching or searching circuits for comparing the incoming codes with stored address codes of the various translation items stored in the magnetic drum;

FIG. 7 shows gate circuits for applying pulses to other circuits;

FIG. 8 shows timing amplifiers and pulse generators for generating and timing synchronizing or control pulses;

FIG. 9 shows another portion of the register circuits for recording incoming address codes;

FIG. 10 shows additional matching circuits;

FIG. 11 shows a plurality of gate and amplifier circuits;

FIG. 12 shows a plurality of recording or writing amplifiers for recording and changing the recorded information of the magnetic drum;

FIG. 13 shows cross-connections of the input leads and leads extending to the control circuits;

FIG. 14 shows starting and control circuits including two delay circuits;

FIG. 15 shows output relay circuits and other control circuits;

FIG. 16 shows connecting relays which were selectively operable to connect the control equipment to a drum circuit;

FIG. 17 shows the control keys employed to record information and change the information recorded in the drum;

FIG. 18 shows a portion of the circuits for interconnecting a translator with a decoder circuit;

FIG. 19 shows a portion of the interconnecting circuits for interconnecting the translator with a decoder circuit;

FIG. 20 shows a portion of the interconnecting circuits for interconnecting the translator with a decoder circuit;

FIG. 21 shows a portion of the interconnecting circuits for interconnecting the translator with a decoder circuit;

FIG. 22 shows a portion of the interconnecting circuits for interconnecting the translator with the decoder circuit; and FIG. 23 shows a manner in which FIGS. 3 through 22, inclusive, are arranged adjacent one another.

General description

Figure 1:
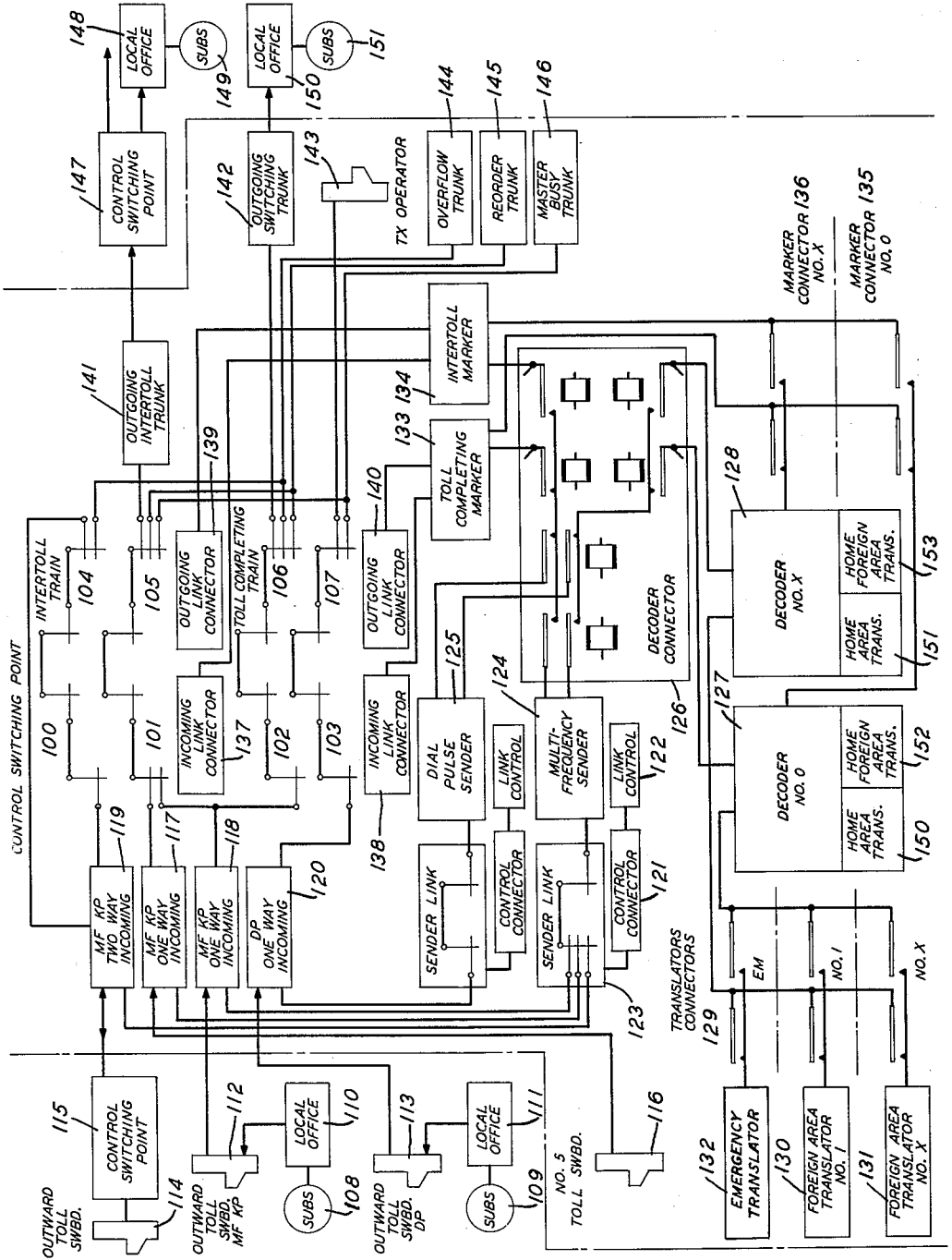
FIG. 1 shows a schematic form of the various circuits and apparatus located at a switching center of an exemplary system embodying the present invention.

FIG. 1 shows in diagrammatic form the equipment at an exemplary control switching point. Calls are switched through a control switching point by means of two sets of crossbar switch frames, namely incoming link frames 100 to 103 and outgoing link frames 104 to 107. Each frame has a set of primary switches and a set of secondary switches, connected by means of frame links in the usual crossbar pattern. The incoming and outgoing link frames are connected by means of junctors in accordance with traffic distribution requirements. In small offices both intertoll traffic and toll completing traffic are handled over the same link frames. In large offices, the frames are divided into two trains, one for intertoll traffic and the other for toll completing traffic. As shown, frames 100, 101, 104 and 105 are part of the intertoll train, while frames 102, 103, 106 and 107 are part of the toll completing train.

Calls which come into a toll or other central switching point, may originate at local subscribers' stations 108, 109 and be extended through the local office 110, 111 to an outward toll operator's switchboard 112, 113. Calls may also come in from a remote operator's position 114 through another control switching point 115. In addition, calls may be originated at the No. 5 or delay operator's switchboard 116.

These calls reach the central switching point over three types of trunk circuits, namely, one-way multifrequency incoming trunks 117, 118, such as that shown in FIG. 1, two-way multifrequency incoming trunks 119 and one-way dial pulse incoming trunks 120. These trunks appear in the incoming frames of either one or both of the trains, depending on traffic requirements. The two-way trunks also appear in an outgoing frame.

When a call is received by a multifrequency trunk, the trunk seizes a sender link control circuit 122 by means of a control connector 121, and the control circuit operates the sender link 123 to connect an idle multifrequency sender 124 with the trunk. A similar link control circuit, control connector and sender link are provided to connect an idle dial pulse sender 125 with an incoming dial pulse trunk. When a sender has been connected with a trunk a signal is sent over the trunk to indicate that pulsing may proceed.

The wanted line designation is then pulsed into the sender. For a toll completing call this designation will take the form of ABX-1234, while for an intertoll call it will be preceded by the area code which will be of the form A0X or A1X. For calls to a toll switching operator the code is 11X, 11XX or 11XXX depending on the number of toll switching operator positions in the area. As soon as three digits have been registered by the sender, it operates the decoder-connector 126 which connects an idle one of the decoders 127, 128 with the sender.

Each decoder has an individual home area translator 150 or 151 or its equivalent and an individual decoder foreign area translator 152 or 153 or its equavalent and has access in common, by means of translator connectors 129 with a plurality of foreign area translators 130, 131 and an emergency translator 132.

As soon as the decoder is connected with the sender, it activates its home area translator and passes the three digits registered in the sender to the home translator. The home translator uses these three digits to select a translation item in which information concerning the registered route is recorded.

The first three digits may or may not be sufficient to determine the routing. If they are not sufficient, the first translation will inform the decoder that more digits are required and the decoder will instruct the sender to release it and call in another decoder when it has the additional number of digits, for example six digits.

When the new decoder is seized it will also call in its home translator, which will again select a three-digit translation item. This translation will tell the decoder the address or identification of the proper six-digit translation. This six-digit translation item may be in the home translator, the decoder foreign area translator or in one of the common translators. Assuming that it is in the common translator 131, the decoder will restore the home translator and operate that one of the translator connectors 129 giving access to translator 131.

The decoder will pass the six digits to translator 131 which will select the six-digit translation item. From this translation the decoder will be informed as to the type of marker required, whether a toll completing marker 133 or an intertoll marker 134 and will operate the proper marker connector 135, 136 to select an idle marker of the required type. As soon as the marker connector is operated, additional multicontact relays in the decoder-connector 126 are operated to connect the selected marker with the sender.

The decoder and marker read the information provided by the six-digit translation item, the decoder passing its information to the marker. When the marker has received all of the information provided by the translation item, the decoder may release, leaving the marker connected with the sender. However, if there are additional groups of trunks or alternate routes available, the decoder indicates to the marker that it has such information and remains connected with the marker.

The marker, from the information provided by the translator connects with a group of trunks and tests for an idle trunk, and having found an idle trunk identifies the outgoing frame on which it is located. It also identifies by way of the sender and sender link the incoming frame on which the incoming trunk is located, operates the incoming link connector 138 and outgoing link connector 140 and then tests for an idle channel connecting the incoming trunk with the selected outgoing trunk. It then operates the link switches, tests the connection for continuity and absence of trouble conditions. The marker passes to the sender information, some of which is received from the translator, to be used by the sender in completing the call and then releases.

Outgoing trunks may be either intertoll trunks 141, outgoing toll switching trunks 142, manual trunks to a toll switching operator's position 143 or signaling trunks such as overflow trunk 144, reorder trunk 145, or masterbusy trunk 146. Intertoll trunks always appear in the intertoll train and extend to another control switching point 147, which may further extend the connection or may complete it through a local office 148 to the called line 149. Switching trunks appear in the toll completing train and complete calls through a local office 150 to a called line 151.

In addition, trunks 142 are used to give access to local offices requiring revertive pulsing. Such trunks are connected by means of a sender link to an outgoing sender, which is set by direct-current key pulses from the sender and in turn responds to revertive pulses from the selected office.

The signaling trunks are used, when a call cannot be completed, to so inform the originating office and are selected either under the instruction of the translator or as a result of marker operation. A reorder trunk 145 provides a tone which tells the originating operator to release the connection and try again. Overflow trunks 144 are individual to an associated group of outgoing trunks. They provide an overflow tone which is changed to a reorder tone as soon as one or more of the outgoing trunks become idle. Master busy trunks 146 also provide a characteristic tone. An originating operator hearing this tone may ring and obtain access to a delay desk where information may be obtained as to the probable delay.

In the specific arrangement disclosed in the above-identified copending application Serial No. 286,267, each of the translators 130, 131, 132, 150, 151, 152 and 153 comprises a separate card handling mechanism commonly called a card translator. A home translator 150, 151, etc. is provided for each of the decoders and a home foreign area translator 152, 153, etc. is also provided for each of the decoders. Due to the slow speed of operation of these devices and due to the fact that they can furnish only a single translation at any instant of time a home area translator must be provided individual to each of the decoders and a home foreign area translator must also be provided individual to each of the decoders. However, the identical information must be stored in the cards in the home area translators 150, 151, etc. and likewise the same information must be stored in the cards in the home foreign area translators 152, 153, etc.

Each of these card translators may be replaced by a separate magnetic drum and related control and translation circuit. However due to the high speed of operation and the fact that all of the recorded translation items are available during each revolution of the drum, a single drum together with the necessary individual circuits may be provided for all of the home area translators 150, 151, etc. and a single drum may also be provided for the home foreign area translators 152, 153, etc. and if the drum is sufficiently large a single drum could be provided for all of these translators with appropriate output and control circuits. Likewise, depending upon the amount of information recorded in the foreign area translators 130, 131, 132, etc. these translators may employ a single or any number of drums and related circuits and equipment.

Figure 2:
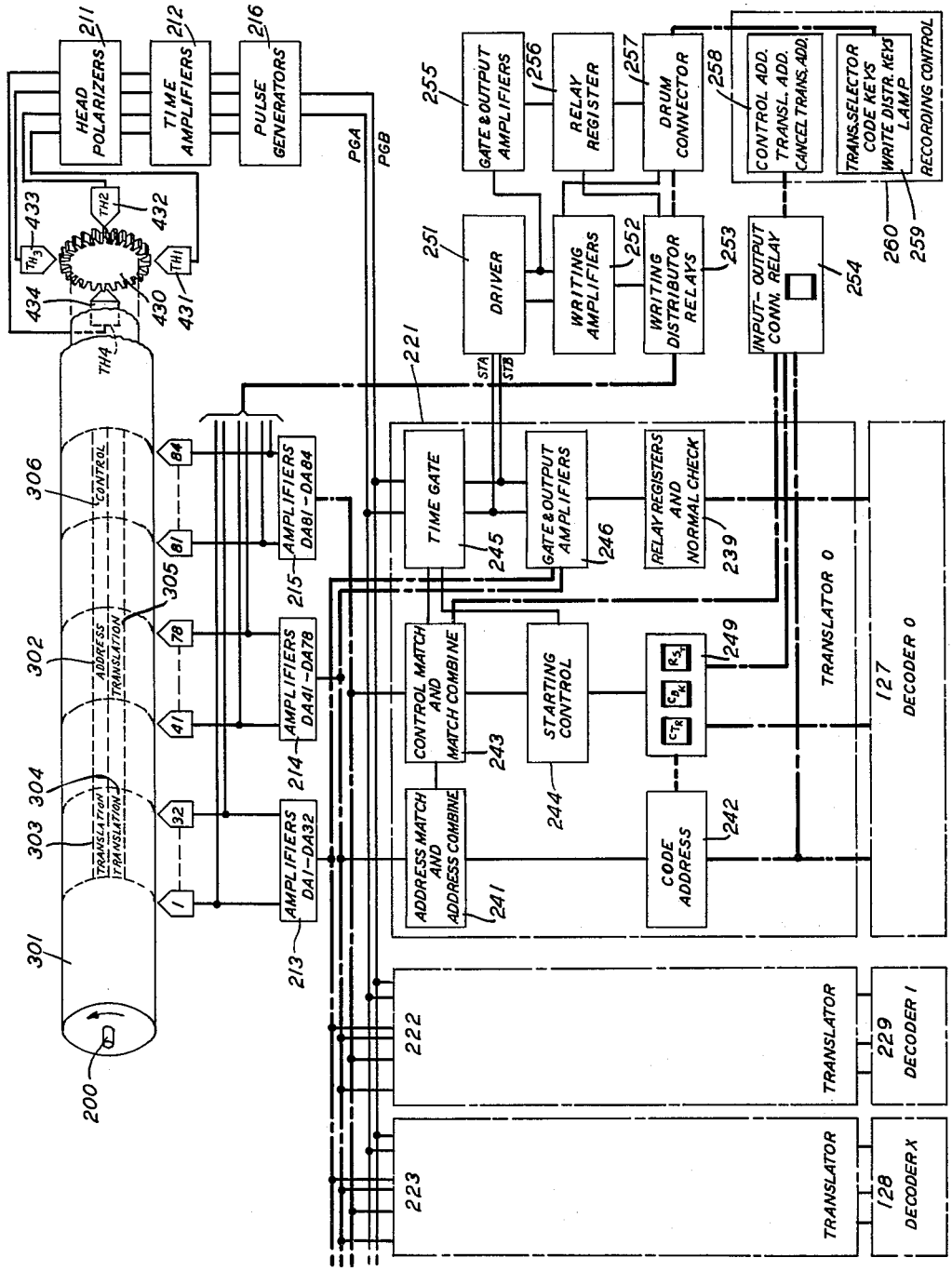
FIG. 2 shows in schematic form a magnetic drum and related control circuit and apparatus therefor comprising a group of translators such as shown in FIG. 1.

In the following the circuit details of a home area translator are disclosed. As shown in FIG. 2, a single drum may be employed for all of the home area translators provided individual input-output circuits are provided. A similar drum and control circuits will be provided for the home foreign translators. Of course all of these translators may be replaced by a single magnetic drum and related control circuits and equipment provided the drum is large enough to record all of the necessary information. The circuits of the home foreign area translator are substantially the same as the circuits of the home area translators so that the operation of the home foreign area translator may be readily understood from the following description of the home area translators. The same applies to the operation of the The various circuits of the exemplary system shown in FIG. 1 operate in substantially the same manner and cooperate with each other and with the magnetic drum translator circuits and equipment in accordance with this invention in substantially the same manner as the various elements cooperate with one another and cooperate with the card translator disclosed in the above-identified copending application. Consequently, a description of the operation of the various elements of the system shown in FIG. 1 is not repeated herein in detail. Reference is made to the above-identified copending application Serial No. 286,267 for description of the detailed circuits and their mode of operation and cooperation as well as the manner in which these various circuits control, respond to and cooperate with the magnetic translator described herein.

*The translator*

An exemplary translator embodying this invention is shown in outline form in FIG. 2. As shown in FIG. 2, a magnetic drum 301 is mounted on the shaft 200 which in turn is continuously rotated at a suitable speed by a motor or engine, not shown. The speed of rotation of the drum need not be synchronous with any of the other circuits. Instead, a timing wheel 430 is rotated on the same shaft 200 or else rotated synchronously with this shaft and employed to control the various drum circuits as described hereinafter.

The drum may be made of any suitable structure material including metals, such as brass, aluminum, iron, steel, stainless steel, die-cast metals, etc. The drum may also be constructed of insulating materials including any of the large numbers of plastic material. The drum is made in the form of a right circular cylinder and mounted on a shaft passing through its axis and arranged to be rotated at high speed on this shaft. The shaft in turn is supported by suitable bearings. The surface of the drum which is constructed to run true has deposited thereon or incorporated therein a magnetic material having permanent magnet properties which material may be in the form of a thin layer. The magnetic material may comprise magnetic powders or may comprise a thin lay of electrodeposited coating of electromagntic material made up of an alloy of nickel and cobalt having a thickness in the range of from 0.0003 inch to 0.0006 inch. However, other thicknesses may be employed with this or other magnetic materials or alloys. When the structure material of the drum comprises insulating materials such as plastic materials it may be desirable to have a layer of conducting material such as brass, copper or aluminum applied over the insulating material and then the magnetic material applied over this conductor alloy.

A plurality of combined reading and recording coils or heads are mounted adjacent the surface of the drum but not in contact therewith. It is desirable to have the surface of the drum run true so that there will be substantially no variation in the air gap between the surface in the drum and these combined recording pickup coils as the drum rotates.

These combined coils are employed for two different functions, namely, (1) the recording of signals in the magnetic material in the drum, and (2) the responding to the recorded signals. These coils are frequently called recording or writing coils or heads and reading coils. Various types of combined reading and writing heads may be employed. One exemplary type of combined heads comprises a core structure of magnetic material having two pole-pieces separated by a small air gap which pole-pieces extend very close to the surface of the drum but are not in contact therewith. It is desirable that these pole-pieces extend to at least within a few thousandths of an inch or closer to the magnetic surface of the rapidly rotating magnetic drum. Suitable exemplary recording and reading and writing coils are described in United States Patent 2,592,652 granted to F. G. Buhrendorf on April 15, 1952 and in a ptaent application of F. G. Buhrendorf, Serial No. 254,537, filed November 2, 1951.

Alternatively the combined reading and writing coils may be constructed without an air gap such as disclosed in a patent application of F. G. Buhrendorf, Serial No. 262,950, filed December 22, 1951. The control circuits in accordance with this invention coperate equally well with both of the above and other types of pickup coils referred to above as well as other well-known coil structures.

One or more coils of wire is wound upon the cores so as to produce a magnetic field adjacent the surface of the rapidly rotating drum, which field is sufficiently strong to change the magnetic condition of small elemental areas of the surface as said areas pass under the coil. Windings are also wound upon the cores in which voltages are induced as elemental areas of the drum having different states of magnetization pass under or adjacent to the coil structure. Frequently, one set of windings is provided for recording and another set for reading purposes. In other cases a single winding may be employed for both purposes.

The coil and core structure is so oriented with respect to the drum, in an exemplary embodiment of this invention, that the magnetic field produced by the cores and responded to by the cores or coils is in the direction of rotation of the drum or opposed thereto depending upon the polarity of the energizing current flowing through the windings of the core structure. When desired, however, the coil structure may be oriented in any other suitable manner to record and respond to other directions of magnetization within the thin layer of magnetic material on the surface of the drum.

The circumferential area on the drum which passes immediately beneath the pole tips or other recording and reproducing portion of a given coil is defined as a "channel." The elemental part of the surface of the drum comprising an elemental portion of a channel or track as defined above which is directly under or immediately adjacent the recording coil when a pulse of writing current is applied to the winding of the coil is frequently called a "cell" or elemental area and is employed for recording a single pulse in or on the drum. Where multiplicity of recording heads are employed as in the exemplary embodiment set forth herein the aggregate of cells or elemental areas which are under several recording heads at any one instant of time is frequently called a "slot." It has been assumed that the "slot" both in FIGS. 3 and 4 comprises a small band or ribbon area on the surface of the drum parallel to the axis thereof. In an actual structure the slots are not such a rectangular area but may comprise any complex pattern of the areas on the surface of the drum depending upon the relative locations of the various combined recording and pickup coils adjacent to the surface of the drum. It may be desirable to stagger the heads or coils in which case the slot may be in the form of a helix slot, a saw-tooth pattern, or any other discontinuous broken pattern or configuration.

In addition, four pickup coils are provided adjacent the timing tooth wheel 430 for producing synchronizing or timing pulses as will be described hereinafter. These four pickup devices are located adjacent the timing wheel in such a manner that the leading edge of a tooth first approaches coil 432, then the leading edge of another tooth approaches coil 433, next the leading edge of still another tooth approaches coil 434 and finally the leading edge of still another tooth approaches coil 431. Thereafter, the leading edge of a succeeding tooth will approach coil 432 and the above process repeated.

As shown in FIG. 2, each of the combined coils or heads is provided with a reading amplifier for amplifying the voltages induced in the windings of the heads as a given magnetized cell or elemental area approaches and passes under respectively combined pickup and recording coils. The rectangle 213 represents thirty-two of these amplifiers which are connected to the heads, 1 through 32. Rectangle 214 represents similar amplifiers connected to heads 41 through 78 and 115 represents amplifiers connected to the heads 81 through 84. Polarizing sources of voltage which are applied to the timing heads 431 through 434 are represented at 211. The timing amplifiers are represented at 212.

With the coils oriented with respect to the individual teeth on the time wheel 430 in the manner described above, four series of interspersed pulses are obtained from the four heads. The heads must be polarized from a source of direct or substantially unvarying current and as the timing wheel rotates the reluctance of magnetic circuit of the pickup coil is varied in such a manner that a pulse or cycle of alternating current is generated within the pickup windings of these coils for each tooth of the timing wheel. These pulses are amplified by the time amplifiers 212 and employed to control pulse generators 216. Two pulse generators are employed, one for generating "A" pulses and the other for generating "B" pulses. These two series of pulses are interleaved one with another. Two of the pickup coils, such as 432 and 434 are employed to generate the "A" pulses, while the other two coils, such as 431 and 433 are employed to generate the "B" pulses.

As illustrated in FIG. 2, the area of the drum is assigned to a number of different items for translation. Each item of translation comprises two adjacent slots. The first slot is defined by the "A" pulses and the second slot by the immediately succeeding "B" pulses. Each of the areas assigned to a given translation is further divided into a control portion, which portion 306 in the first slot is defined by the "A" pulses, and the address portion 302 which is also defined by the "A" pulses and a translation portion 303 for recording information to be obtained as a result of the translation, which portion is also controlled by "A" pulses. Two additional portions 304 and 305 are defined by the "B" pulses and employed to provide the output translated information. The control portion 306 is employed to control the recording of different information in the other portions of each translation area and for testing and other control purposes. The address portion 302 is employed to record signals identifying the translation which signals are employed to select the translation item under control of incoming or applied signals as will be described hereinafter. The translation or output portions are employed to store and transmit the desired output information in response to the given input information. In supplying this output information it is to be noted that the stored information on the surface of the magnetic drum is not in any way destroyed, consumed or otherwise eliminated or dissipated. In addition, a group of writing amplifiers 252, together with driving amplifiers 251 and gate and output circuits 255 as well as the relay register circuit 256 is provided for each of the drums. Distributor relays 253 are employed to selectively connect the writing amplifiers to the writing windings of the combined reading and writing coils. In addition, administration circuits and key set 260 and recording control circuits are provided which comprise the address control keys 258 and the translating selecting keys 259. In addition, an output-input connector 254 is provided for connecting the address control circuits to the reading amplifiers 214 which read the address signals recorded on the drum.

As pointed out hereinbefore, a plurality of decoders are provided at the switching stations and each of the decoders has exclusive use of the translator input and output circuit connections. One such connection is provided for a so-called home translator and another for a home foreign translator. Provisions are also made for connecting to foreign area translators. A plurality of decoders such as 127, 128 and 229 are represented in FIG. 2. Each of these decoders is provided with input-output circuits such as 221, 223 and 222, respectively. Each of these decoders may be provided with an individual magnetic drum for each of the translators. However, as assumed herein and shown in FIG. 2, these translators comprise home translators. All of these home translators are supplied from the same drum and the same combined pickup and recording heads, as well as the amplifiers 212, 213, 214 and 215. Each decoder then has an individual input-output circuit for the home translation and all the decoders can use this drum substantially simultaneously. An additional drum or at least additional pickup heads and additional control circuits will be provided for the home foreign translators of all the decoders and each of the decoders will have an individual input-output circuit for the home foreign area translations which circuits and apparatus will be substantially a duplicate of the circuits and equipment which are described herein and shown in FIG. 2. Likewise, an additional drum or at least additional channels and pick-up devices as well as additional control circuits will be provided for the other foreign area translators shown in FIG. 1 and described in detail in the above-identified Gooderham et al. application. In this case the input-output circuits will be individual to the respective translators and interconnected with the decoders when required in the same manner as described in the above-identified copending application.

Each of the input-output circuits such as 221 comprises a plurality of address code relays 242, address match and combine circuit 241, a control match and match combine circuit 243, time gate circuit 245, starting control circuit 244, the gate and output circuits 246 and relay registers and check circuits 239.

Assume for the moment that all of the necessary information required for any of a plurality of translations have been recorded on the drum and that this information has been checked and found to be correct and satisfactory for operating the switching system. Further, assume that decoder 127 requests the translation and supplies address signals, that is, area code or the area and office code of a called subscriber station which has been dialed into a register and now conveyed to the address code relays 242. These relays operate and if the code is properly received cause a check relay to operate which indicates to the decoder that the area code, or the area code and the office code as the case may be, are completely received and properly registered in the input-output circuit 221. If these codes are not completely received and registered, a different signal is transmitted to the decoder which may then request a second try or may cause an alarm to be sounded or indicated or both.

Upon the satisfactory reception of a complete address of a translation item the operation of the check relay initiates the operation of the address match and control match circuits as well as the address combine and match combine circuits. As a result the address match and control match circuits start hunting for the address which corresponds to the setting of the address code relays 242. When the corresponding address signals in some area on the drum such as 302 pass under the reading heads 41 through 78 and the proper control signals in area 306 pass under the heads 81 through 84, an output pulse is obtained from the address match and address combine circuit 241 and also from the control match and match combine circuit 243. This pulse is applied to the time gate circuit 245 which causes a gate pulse to be applied to the gate and output amplifiers 246 which in turn set relays 239 in accordance with the signals recorded in area 303. During the next succeeding slot which is also assigned to record information of the requested translation, a "B" output pulse will be obtained from the time gate 245 and applied to the gate and output amplifiers which in turn set additional relay registers under control of the areas 304 and 305 of the translation item. Thereafter, the setting of the relay registers 239 is conveyed back to the decoder 127 as the translated information.

In order to initially store the translation items and necessary information an administration circuit 260 is provided together with the writing amplifiers 252, driver 251, the gate and output amplifiers 255, relay register 256, the drum connector relays and circuits 257 and the writing distributor relays 253 have been provided. This equipment is also provided for altering and adding to the translation items at any desired time.

When the translator in accordance with the exemplary embodiment of this invention set forth herein is first put into service the surface of the drum is all polarized or magnetized in one direction which is assumed herein to be in the minus direction. That is, the direction produced by causing a negative current to flow in the writing windings which current represents zeroes to be recorded. The drum in accordance with this invention records or stores two different magnetic conditions one representing zeros and the other ones or X's. The ones are recorded by positive currents caused to flow through the recording coils or windings or heads as described herein. Of course, the polarities of the two currents may be reversed and the system will work equally well.

After the drum has been set in the zero condition, that is, all the elemental areas of the surface thereof are magnetized in the zero or negative direction, the various control keys are manipulated so that the first idle area assigned for translation is selected under control of the control section 306 of the areas assigned to a translation item. This control area 306 is then changed to record a recording signal. Thereafter under control of the recording signal the keys of the administration unit 260 are manipulated in such a manner that the required information is recorded in the address portion 302 to fully and properly identify the translation and also in the other areas 303, 304 and 305 for supplying the output translated information. After all the information of the translation has been recorded in the area assigned for this translation, the signals stored in the control section are then changed so that they now indicate that the translation in the corresponding area is available for use in controlling the switching circuits of a typical switching center, such as shown in FIG. 1.

In a similar manner any translation recorded in the drum may be examined and changed when desired or necessary. In order to change a translation the administrative keys must be manipulated or positioned first so that the administrative equipment, including various keys, writing amplifiers and other connections, are properly interconnected together and also interconnected with the drum and translation circuits. Thus the proper input-output connecting relay 254 is operated to connect the control address translation address keys 258 with the code address relays 242, with control circuit 249, and with the control and match combine circuit 243. Likewise the writing distributor relays 253 are operated to connect the writing amplifiers 252 with the proper reading and writing heads 81 through 84. The driver circuit 251 is also connected to the proper timing circuits.

Thereafter, the operator or attendant first actuates the control address and translation address keys 258 to set the code address relays 242 and the control match circuit 243 to represent the address of the translation which it is desired to inspect or change. In addition, the operator or attendant will set the writing keys 259 so as to change the control address from a translation available indication to a recording or changing translation. Thereafter, the operator or attendant will change the control address keys to represent the change or recording control address and may either leave the translation address keys actuated in accordance with the desired translation, when it is not desired to change this translation address, or the operator may restore these keys and actuate another key to cancel the operation of the code address relays 242. In addition, the operator will actuate the proper keys to interconnect the writing amplifiers with the desired recording heads and also to actuate these amplifiers to cause the proper translation signals to be recorded with the corresponding areas of the drum. After the operator or attendant has properly recorded the desired signals in each of the areas of translation items of the drum, the operator or attendant will then cause the writing amplifiers to be again connected to the heads 81 through 84 and will cause the signals recorded in the control area 306 to be changed to indicate that the translation is available after which the translation may be checked by means of the normal checking circuits in the switching office and thereafter employed to control the switching circuits.

Additional and other translations may be entered, checked or changed in similar manners by control of the administrative apparatus in the manner described herein.

Of course, the particular decoder which employs the input-output circuit 221 employed by the administrative circuits must be made busy so that it cannot interfere with the operation of these circuits. However, the other input-output circuits 222, 223, etc., may be operated in their normal manner to deliver translations to the decoders in their normal manner during the time translations are added or being changed. It should be noted that by the use of the control address these other input-output circuits and translators are unable to employ any of the translations being added or changed until they are completed and the control address changed to a translation available indication in the manner described herein.

In operating the administrative equipment the various keys must be positioned in the manner described above and, in addition, other keys actuated to connect the writing amplifiers to the proper leads extending to the recording windings of the combined reproducing and recording heads so that the proper information may be recorded in the proper portions of the equipment.

*Synchronizing*

Synchronizing pulses or signals for coordinating and timing various circuits as well as defining the cell areas on the drum are derived from the tooth wheel 430 which may be, but need not be, mounted on the same shaft and rotated with the magnetic drum 301 as shown in FIGS. 3 and 4. The four pickup coils or heads 431, 432, 433 and 434 are provided and cooperate with the tooth wheel 430. In an exemplary embodiment of this invention the tooth wheel 430 is provided with 512 teeth. Each of the pickup coils 431 through 434 is adjusted with respect to the teeth of wheel 430 so that the leading edge of a tooth first moves adjacent to pickup device 432, then the leading edge of another tooth moves adjacent to pickup device 433 and then the leading edge of a tooth moves adjacent pickup device 434 and finally the leading edge of another tooth moves adjacent to pickup device 431 and then the leading edge of a second tooth moves adjacent the pickup coil 432 and so on. Consequently, the output from each of the coils is interleaved in such a manner that 2048 separate distinct pulses which are substantially evenly spaced in time are derived from these four coils as the wheel 430 rotates with the magnetic drum 301. Each of the pickup coils 431 through 434 is provided with a polarizing circuit which extends from the respective grounded sources of potentials 435 through 438, inclusive, and then through the windings or coils of the respective pickup coils or heads 431 through 434 and then through the respective resistors 415 through 418 and 411 through 414 to ground.

The output of the coils is obtained from the voltage divider or potentiometers 411 through 414, respectively, which is coupled through the coupling condensers 421, 422, 423 and 424 to the respective time amplifiers 811, 812, 813 and 814. By providing a polarizing energy source of substantially constant or unvarying current there is produced a magnetization in the head which, due to changes in reluctance as each of the teeth on wheel 430 moves past the pickup coils, causes a change in flux through the coil which in turn causes voltages to be induced in the windings of these coils. These voltages cause current to flow through the terminating resistors 415, 416, 417 and 418, respectively, and are applied to the output potentiometers 411 through 414.

Each of the time amplifiers 811, 812, 813 and 814 is similar to amplifier 811 which is shown in detail in FIG. 8. This amplifier comprises a twin-triode tube 815 which is employed to amplify the low level signals or voltages derived from the pickup heads or coils 431 through 434. This portion of the amplifier is a resistance-capacity coupled two-stage amplifier and works in the usual manner of such amplifiers and is designed to have sufficiently broad pass-band to amplify the signals derived from tooth wheel 430. The potential divider resistors 822 and 823 adjust or control the over-all gain of the amplifier. A second tube 821 is included in each of the amplifiers 811 through 814, inclusive. The tube 821 is another twin-triode tube in which the first or left-hand section is employed as an amplifier and clipper or limiting device and limits or clips the positive excursion of the signals applied to its grid and thus tends to make the positive portion of the signals incoming to the grid substantially ineffective to drive the grid more positive than the cathode. The magnitude of the negative excursion of the signals incoming to the grid is several times that required for plate current cut-off. The resultant positive signals at the plate are thus substantially square in wave form. The second right-hand section of tube 821 is employed as an output cathode-follower stage to drive succeeding circuits. Each of the other amplifiers 812, 813 and 814 comprises similar tubes which are connected in similar circuits and operate in similar manners.

The output of the time amplifiers 811 through 814 are connected to two pulse generating circuits, one for generating the so-called "A" pulses and the other for generating the "B" pulses. Thus, the time amplifiers 812 and 814 are connected to the left-hand pulse generator comprising tubes 851, 852 and 853 while the output from the amplifiers 811 and 813 is connected to the "B" pulse generator comprising tubes 871, 872 and 873. By thus connecting the time amplifiers 811 to 814, inclusive, two series of output pulses are obtained in which the pulses of each series are interspersed between the pulses of the other series.

Pulse amplifiers or generators are employed to generate pulses of short duration of the order of two microseconds in length or shorter from the square waves obtained from the time amplifiers 811, 812, 813 and 814.

Each of the pulse generators comprises two input tubes or sections, namely tube 851 and the left-hand section of tube 852. Each of these sections is normally biased to cut-off by the grid bias potential obtained from the bias source 661 through a voltage divider. Thus the grid of tube 851 is connected to the center point of the voltage divider resistors 862 and 863 while the grid of the left-hand section of tube 852 is connected to the center point of the voltage divider resistors 864 and 865. The cathodes of both of these tubes are connected to ground. Consequently, the tubes are normally biased so that substantially no current flows in their output circuits. Each of their anodes is connected to a resonant circuit comprising inductor 854 and condenser 855. Thus when the square wave from the time amplifier 812 goes from a low negative value to a high or positive value, a positive-going pulse or signal is applied through the coupling condenser to the grid of tube 852 causing an abrupt increase of flow of current in the anode circuit of the left-hand section of tube 852. This increase or surge of current causes a negative excursion or half cycle of current to flow in the resonant circuits 854 and 855 which circuit tends to oscillate. However, as this current falls to zero the diode or crystal rectifier 856 becomes conducting and applies the damping resistor 857 across the resonant circuit thus effectively preventing any positive excursions of the voltage of the resonant circuit 854. As a result, only a half-cycle pulse is obtained across the resonant circuit, each such pulse is likewise obtained across the resonant circuit each time the square wave from the time amplifier 814 changes from a low or negative value to a high or positive value. This voltage is applied to the coupling condenser to the grid of tube 851 which in turn causes a surge of current to flow in the anode-cathode circuit of tube 851. This surge of current again excites the resonant circuit comprising inductor 854 and the condenser 855. As a result of a single half cycle of the resonant current flows in this resonant circuit.

The duration of this half cycle is controlled by the resonant frequency of the resonant circuit and is substantially independent of the length of the square pulse applied to the grid of tube 851 or the left-hand section of tube 852 and thus independent of the time during which current flows in the anode-cathode circuit of these tubes. It should be noted that when the output of the respective time amplifiers changes from a high value to a low value thus interrupting or terminating the surge of current through the respective anode-cathode paths of tube 851 or 852, the anodes of these tubes rise abruptly to a relatively high value. This abrupt change in voltage across the resonant circuits 854 and 855 however does not produce any oscillating currents within the circuits because this voltage is rapidly damped out by the diode 856 which becomes conducting at this time before an oscillation can be established.

The voltage obtained from the resonant circuit comprising inductor 854 and condenser 855 is coupled through the coupling condenser 858 to the grid of the right-hand section of tube 852 which operates as a limiting amplifier and applies a pulse of approximately two microseconds duration through the coupling condenser 859 to the grid of tube 853. Tube 853 operates as a cathode follower and repeats a positive pulse of substantially square wave form and approximately two microseconds duration across the cathode resistor 860 and then over the output lead 866 to the various gate and other control circuits described herein.

The "B" amplifier comprises tubes 871, 872 and 873 which operate in a similar manner in response to the square waves derived from the time amplifiers 811 and 813 and generates square wave pulses of approximately two microseconds duration which are applied to the output conductor 886. This conductor extends various gating and control circuits described herein.

*Entering a translation item*

When a magnetic drum is first received and before it is put into operation it is necessary to enter the various translation items in or on the surface of the magnetic material of the drum. In order to properly enter the various translation items the surface of the drum is first polarized or magnetized in one or the other of the two directions of magnetization employed in storing the translation items. It is assumed herein that the drum will be polarized or magnetized initially in the same manner as it is magnetized when it is recording zeros, that is, by the application of negative pulses to the recording coils or heads. One way in which the drum is initially polarized is to cause direct current of a suitable magnitude to flow through each of the recording and pickup coils during one or more revolutions of the drum. With the drum thus polarized in a suitable manner by temporary circuit connections not shown in the drawing, the drum equipment is ready for recording the translation items. The power will be applied to the various circuits and the drum set into rotation by applying power to the electric motor driving it or actuating any other driving means which is provided.

The operator or attendant will then manipulate the various keys in the administration or operating position shown in FIG. 17 to properly record the various items of information comprising one or more translation items.

The attendant will first operate one of the keys 1785, 1786, 1787, etc. to select the drum upon which it is desired to enter a translation item. One of these keys will be provided for each drum in the office. In accordance with the circuits shown herein the operator or attendant will operate key 1785 in order to enter translation items upon the drum 301 shown in FIGS. 3 and 4. The operation of key 1785 causes relay 1630 to operate which relay in turn connects the recording code keys 1781, 1782, 1793 and 1794 to the input circuits of the writing or recording amplifiers shown in FIG. 12. As shown in FIG. 12, four writing amplifiers are provided. Two keys are provided for controlling each of these amplifiers, one of the keys for causing the amplifier to record either a 1 or a 0 under control of the "A" pulses and the other key for causing the amplifier to record either a 1 or a 0 under control of the "B" pulses which "A" and "B" pulses are obtained from the synchronizing circuit in the manner described above.

The operation of relay 1630 also connects the windings of relays 1601, 1608, 1611, 1619, 1620, 1621, etc. to the corresponding keys 1701, 1708, 1711, 1719, 1720, 1721, etc. Consequently, when any one of the keys 1701 through 1721 is operated, a corresponding one of the relays 1601 through 1621 will be operated. The operation of any of these relays connects the output from the four writing amplifiers shown in FIG. 12 to the corresponding conductors extending to the combined reading and writing coils or heads shown in FIGS. 3 and 4. These heads are designated 1 through 32 in FIG. 3 and 41 through 78 and 81 through 84 in FIG. 4. The leads from the relays 1601 through 1621, inclusive as shown in FIG. 16 connect the output of the writing amplifiers to the respectively designated conductors AD1 through AD32, AD41 through AD78, and AD81 through AD84 extending to the respective combined reading and writing coils or heads shown in FIGS. 3 and 4 which are located adjacent the surface or periphery of the drum 301.

The operation of key 1785 also causes relay 1511 to operate which relay in turn connects the keys 1741 through 1778 to the input code relays shown in FIGS. 5 and 9. These code relays in turn apply ground through conductors extending to the match circuit shown in FIGS. 6 and 10. The operation of relay 1511 also connects the control match circuit input leads CA1, CA2, CA3 and CA4 to the control address keys 1731, 1732, 1733 and 1734 for controlling the input to the control match circuit as will be described hereinafter. The operation of relay 1511 also connects a conductor from key 1788 to the winding of relay 1512 so that relay 1512 will be operated under control of key 1788. The operation of relay 1511 also extends conductor 1794 from the keys 1701 through 1721 to the contacts of relay 1512.

After operating key 1785 the operator or attendant will also operate key 1788 which key in turn operates relay 1512. Relay 1512 in operating applies positive potential to the grid of tube 1413 through the diode 1411. The diode 1411 is connected so as to readily pass the positive voltage from the contacts of relay 1512 to the grid of tube 1413 independently of the voltage conditions applied to the right-hand terminal of the diode or rectifier 1412. Tube 1413 thereupon conducts current and causes its cathode to rise to a positive potential, which positive potential is near to the potential applied to the grid of this tube. The positive potential from the cathode of tube 1413 is applied through diode 1416 to the grid of tube 1414. This potential, however, is applied in such a direction that it is not transmitted to the grid of tube 1414 unless the other diodes 1415 and 1417 also have positive potential applied to their lower or right-hand terminals. In other words, the diodes 1415, 1416 and 1417 comprise a so-called "and" circuit, while the diodes 1411 and 1412 comprise a so-called "or" circuit.

The operator or attendant after operating both keys 1785 and 1788 will then set the control address keys 1731 through 1734 in accordance with the control address to be searched for on the drum. Inasmuch as the drum has been previously polarized to have stored therein all zeros by the application of negative signals or pulses or potentials to the recording windings of the combined recording and pickup heads, the attendant will leave all of the keys 1731 through 1734, inclusive, non-operated thus directing the control circuits to search for a control code having all zeros.

The operator will next set the control keys 1781 through 1794 in accordance with a predetermined pattern or code which pattern or code is one which will be employed to identify a space assigned to a translation item upon the surface of the drum during that time the information comprising the translating item is being entered, stored or changed in the magnetic surface of the drum.

For purposes of illustration, it is assumed that this code comprises a 1 or marking signal in the first two tracks or channels on the drum which pass under recording heads 81 and 82, and a zero or blank in the two tracks which pass under the recording heads 83 and 84. As described above and shown in FIG. 2 the control section 306 is located in the first slot along the drum so that the control of both recording and reading of information in this section is controlled by the "A" synchronizing or control pulses. As a result, the first two keys 1781 and 1782 for controlling the writing under "A" synchronizing pulses will be operated to record ones. The remaining keys may be left normal or the next two keys operated to control the writing of zeros in the drum circuit. The final four keys will be left normal since it is not desired to write in the control section under control of the "B" synchronizing pulses.

The address keys 1741 through 1778 need not be operated at this time because the operation of key 1788 causes relay 1512 to operate and apply potential to the address combine tube 1413, thus rendering the address match circuits which are controlled by keys 1741 through 1778 ineffective under the assumed conditions.

The exact order in which the above-enumerated keys are operated is immaterial so long as all of these keys are operated before any of the keys 1701 to 1721 are operated. Upon the operation of the above-enumerated keys in the manner described above, the operator will next operate key 1721 which causes relay 1621 to operate and connect the output of the writing amplifiers to the conductors 81 through 84 extending to the combined reading and writing heads 81 through 84 located adjacent the control tracks on the drum.

The operation of relay 1621 also applies positive battery through its upper outer operated contacts and through the winding of relay 1644 to the anode of tube 1643, thus energizing tube 1643. Tube 1643 however, does not conduct at this time because it has a negative voltage applied to its grid from the grid of the left-hand section of tube 1642.

The operation of key 1721 also completes a circuit for the operation of relay 1513 which circuit extends from battery through the winding of relay 1513, the upper operated contacts of relay 1512, the lower inner operated contacts of relay 1511, conductor 1794 to ground through the right-hand operated contacts of key 1721.

Relay 1513 in operating connects anode potential through its second contact from the bottom and the middle set of normal contacts of relay 1514 to the anodes of the gate and output amplifiers shown in FIG. 11 through the windings of corresponding relays such as the winding of relay 1515. However, these amplifiers and outputs are not effective under the assumed conditions.

The operation of relay 1513 also connects ground to conductor 1422 extending to the starting control circuit of FIG. 14. Lead 1422 normally has a negative voltage applied to it by means of the voltage dividing resistors 1437 and 1438. Consequently, condenser 1434 normally has a negative voltage with respect to ground on its upper terminal. Likewise, the left-hand terminals of condensers 1435 and 1436 have a negative voltage connected to their left-hand terminals. These condensers also have a voltage due to the respective voltage dividers 1439 and 1440 connected to their right-hand terminals. These negative voltages serve as a bias for the respective diodes 1421 and 1423 so that these diodes normally have a high impedance and thus prevent the application of negative pulses of appreciable magnitude to the grids of the left-hand sections of the respective tubes 1420 and 1424.

Both sections of tube 1420 are connected in a single cycle multivibrator circuit in which the right-hand section normally conducts current. Both sections of tube 1424 are arranged in a similar circuit with the right-hand section normally conducting current. In an exemplary embodiment of this invention the circuits of tube 1420 are arranged so that when a flow of current is initiated through the left-hand section thereof current will continue to flow through this section, with the right-hand section cut off, for approximately three milliseconds after which time the right-hand section again starts to conduct current and interrupts a flow of current through the left-hand section of this tube.

In the case of tube 1424 the time interval is approximately forty-five milliseconds instead of three milliseconds.

Thus when ground is connected to conductor 1422 in the manner described above the voltage of this conductor rises from the negative value determined by the voltage divider resistors 1437 and 1438 to substantially ground potential. The condensers 1435 and 1436 have a small electrostatic capacity so that these condensers, together with relatively low resistance of the respective divider resistors 1439 and 1440, form a differentiating circuit and cause, at this time, positive pulses of short duration, which positive pulses overcome the negative bias applied to diodes 1421 and 1423. As a result, the impedance of these diodes falls to a low value so these diodes then readily transmit these positive pulses to the control grid of the left-hand sections of the respective tubes 1420 and 1424. The diodes 1421 and 1423 are poled to readily convey the positive voltage or pulses applied from the differentiating condensers 1435 and 1436. The application of the positive voltage to the left-hand section of tubes 1420 and 1424 at this time in response to the ground applied to the conductor 1422 causes a flow of current through the left-hand section of these tubes 1420 and 1424 to be initiated which in turn interrupts the flow of current through the right-hand section of these tubes.

The interruption of the flow of current through the right-hand section of these tubes is due to a more negative voltage applied to the grid of the right-hand section from the anode circuit of the left-hand section of the respective tubes. The grid of the right-hand section of tube 1420 is coupled to the grid of the left-hand section of tube 1425 so that a flow of current through this left-hand section is likewise interrupted or reduced with the result that a positive voltage is applied to the grid of the right-hand section of tube 1425. The right-hand section operates as a cathode follower so that a correspondingly more positive voltage is applied from the cathode of the right-hand section of this tube and through the coupling condenser and diode 1429 to the control grid of the right-hand section of tube 1430.

Two sections of tube 1430 are connected in an Eccles-

Jordan or flip-flop circuit with the right-hand section normally conducting current. The diode 1429 is connected in such a manner as to oppose the application of positive voltage to the grid of the left-hand section of tube 1430. In addition, the grid of the right-hand section is normally at its more positive value so this section is normally conducting so that the application of a positive voltage or pulse to this grid at this time will not change the conduction within the tube or otherwise interfere with the operation or circuits of the system.

The next "B" synchronizing pulse generated by the "B" synchronizing circuit shown in FIG. 8 is applied over conductor 886, which conductor extends through FIGS. 7, 11 and 15, to condenser 1446 and then to the anode of the left-hand section of tube 1420, and also through the coupling condenser 1447 to the grid of the right-hand section of this tube. The positive "B" pulse applied to lead 886 occurs before the end of the three milliseconds after the grounding of the conductor 1422. The application of a positive pulse to the right-hand grid of tube 1420 at this time again initiates the flow of current through the right-hand section and interrupts a flow of current through the left-hand section of this tube.

Due to the positive pulse applied to the control grid of the right-hand section of tube 1420 and the initiation of conduction through this section, a still more positive voltage is applied to the grid of the right-hand section due to the interruption of a discharge through the left-hand section and the coupling between these two sections. The positive voltage applied to the grid of the right-hand section of tube 1420 is also applied to the grid of the left-hand section of tube 1425 which repeats and amplifies this pulse or voltage and applies a negative voltage to the control grid of the right-hand section of tube 1425. As a result, the negative voltage or pulse applied to this grid is repeated by the right-hand or cathode-follower section of tube 1425 which negative pulse is transmitted from the cathode of tube 1425 through the coupling condenser and diode 1429 to the anode of the left-hand section of tube 1430 and the grid of the right-hand section of this tube. The application of a negative pulse to the grid of the right-hand section of tube 1430 interrupts the current flowing through this section which in turn causes the current flowing through the left-hand section to be initiated. The negative pulse or voltage applied to the grid of the right-hand section of tube 1430 is also applied to the grid of the left-hand section of tube 1432 which section amplifies this voltage or pulse and inverts so that a positive pulse is applied to the control grid of the right-hand section of tube 1432. The right-hand section operates as a cathode follower and as a result positive voltage is applied to the output lead 1441. Thus, in response to the "B" pulse which follows the operation of key 1721 and the operation of relay 1513, a positive voltage is applied to conductor 1441.

The application of a positive voltage to the conductor 1441 applies positive voltage to the lower terminal of the diode 1415. However, positive voltage is not at this time applied to the right-hand terminal of the diode 1417 so that diode 1417 maintains the voltage of the grid of tube 1414 at a relatively low value near ground potential with the result that tube 1414 does not respond to the application of the positive voltage to conductor 1443 at this time.

The control address keys 1731 through 1734 as indicated above have all been set in their zero position. In other words, their contacts are open. In addition, as pointed out above, all of the elements or elemental areas suitable for recording information on the drum have also been set to their zero position. Consequently, match is obtained at all times between the conductors AD81 through AD84 and the conductors CA1, CA2, CA3 and CA4 before the recording of the first set of control indicia in the surface of the drum.

Upon encountering, each match between the conductors CA1, CA2, CA3 and CA4 and the conductors AD81 through AD84, respectively, which extend through the respective reading amplifiers to the corresponding combined recording and reading pickup coils in FIGS. 3 and 4, the control match circuit shown in the lower portion of FIG. 10 applies positive battery to the output lead 1011 which lead extends to the right-hand terminal of diode 1417.

Thus, upon the obtaining of a match between the input signal conditions from keys 1731 through 1734 and the signals recorded in the respective channels under heads 81 through 84, a positive voltage is applied to the left-hand terminal of diode 1417; upon the operation of key 1788 and the operation of relay 1512 a positive voltage is applied to the left-hand terminal of diode 1416; and upon the operation of key 1721 and the operation of relay 1513 a positive voltage is also applied to the lower terminal of diode 1415 by the next "B" synchronizing pulse. The simultaneous application of all of these positive voltages to the respective diodes causes a positive voltage to be applied to the grid of tube 1414. Tube 1414 operates as a cathode follower and repeats a positive voltage over the output conductor 1443. This conductor extends through FIGS. 11 and 15 to diode 710 in FIG. 7.

The application of a positive pulse or voltage on conductor 1443 to diode 710 initiates the operation of the time gates of FIG. 7. "A" pulses from conductor 866 are applied through the voltage divider comprising resistors 722 and 723 to the control grid of tube 712. The "A" pulses are also applied through coupling condenser 724 and diode 716 to the control grid of the left-hand section of tube 715. Tube 715 has both sections connected in a double stability circuit and the application of the first "A" pulses, which pulses are positive, to the left-hand control grid causes the left-hand section of this tube to become conducting and remain conducting until conduction is changed as described hereinafter. So long as the left-hand section of this tube remains conducting the succeeding "A" pulses applied to the grid of the left-hand section of tube 715 through condenser 724 are ineffective because the left-hand section is conducting and the lower terminal of diode 716 is at ground potential. Also, the upper terminal of diode 716 biased slightly negative to prevent noise surges from affecting the operation of the tube.

The application of the "A" pulses through the voltage divider resistors 722 and 723 to the left-hand grid of tube 712 normally do not apply positive voltage to the grid of tube 712 because these pulses are readily transmitted through the diode 710 to ground through the cathode resistor 1444 of tube 1414. As a result, the voltage of the grid of tube 712 is maintained at or near ground voltage so that the tube is substantially non-conducting due to the cathode resistor 740. However, upon the application of a positive voltage to the conductor 1443 as described above, the impedance on the diode 710 then becomes relatively high so that upon the next application of an "A" pulse over lead 866 positive voltage will be applied to the grids of tube 712 which causes this tube to become conducting. As a result, a positive output voltage or pulse is obtained from the cathode of tube 712 since this tube operates as a cathode follower. This positive pulse is applied through the coupling condenser 725 and the diode 717 to the grid of the right-hand section of tube 715. The application of positive pulse to this grid causes the flow of current to the right-hand section to be initiated which flow of current overcomes the effect of the positive "A" pulses applied to the left-hand grid of tube 715 and causes the current flowing through the left-hand section of this tube to be interrupted. As a result, the grid of the left-hand section of tube 715 becomes negative and this negative voltage is applied to the grid of the right-hand section of tube 714 and repeated as a positive voltage and applied to the control grid of the left-hand section of tube 714. The left-hand section of tube 714 operates as a cathode follower and in turn repeats and applies a positive voltage to the left-hand terminal of the diode 711.

The positive output selected "A" pulse is applied to the gate and output amplifiers shown in FIG. 11. Since the output of these amplifiers is not employed at this time their operation will not be described further at this time. Operation of these amplifiers is described more fully hereinafter.

The positive output selected "A" pulse from the cathode of tube 712 is applied to the grid of the left-hand section of tube 718 through the coupling condenser 742. The left-hand section of tube 718 operates as an amplifier tube and repeats the pulse through the upper winding of the coil or transformer 720. The right-hand section of tube 718 operates as an over-biased blocking oscillator. When a positive pulse is applied to the grid of tube 718 the repeated pulse through the upper winding of transformer 720 initiates the operation of the right-hand section of tube 718 which in turn applies a positive pulse to the output conductor 744. This pulse is applied over conductor 744 to the writing amplifiers shown in FIG. 12. The right-hand section of tube 718 operates as a power output tube and delivers a pulse of appreciable energy from the low impedance source of its cathode circuit comprising the resistor 726.

In accordance with the code assumed above key 1781 will be operated to write a one and as a result positive potential is applied to conductor 1201 of the input circuit of the writing amplifier 1200. The upper section of amplifier 1200 is employed to write ones while the lower section is employed to write zeros. The positive potential applied to conductor 1201 by key 1781 is applied to the junction between diodes 1205 and 1207 through the voltage divider resistors 1203. This voltage, however, is ineffective to actuate tube 1223 because diode 1207 is normally connected to substantial ground potential over conductor 744 through the cathode resistor 726. With positive potential applied to conductor 1201 the impedance of the diode 1207 is low so that the junction between diodes 1205 are maintained at a relatively low voltage near ground potential.

However, the application of a positive pulse or voltage to conductor 744 in response to the selected "A" pulse described above raises the voltage of the lower terminal of diode 1207 with the result that the voltage of the junction between diodes 1205 and 1207 rises to a relatively high positive value so a pulse is transmitted through the diode 1205 and coupling condenser 1221 to the grid of tube 1223. Tube 1223 is normally biased to be non-conducting by means of the voltage divider 1209 but on the application of the positive pulse as described above tube 1223 becomes conducting and repeats the pulse to the lower winding of the blocking oscillator coil or transformer 1227. As a result, the over-biased blocking oscillator tube 1225 is set into operation in response to the pulse from tube 1223 with the result that a writing pulse of large magnitude flows in the output circuit of tube 1225 and through the coupling transformer 1230. The output winding of the transformer 1230 extends through contacts of relay 1621 to conductor AD81 and thence to the writing winding of the combined recording and pickup coil 81. As a result, an "X" or "one" is written in the channel under the pickup coil 81 in the "A" slot assigned to record the translation item. Inasmuch as a "one" was also to be written in the second channel of the slot the amplifier 1250 operates in substantially the same manner in response to the same output pulse from the right-hand section of tube 718 and in turn causes a "one" to be written by the combined writing and reading head 82 in the 82nd channel of a slot of the translation in question. It should be noted that this particular slot has been selected at random in being the first idle slot to pass under the pickup coils and having all blanks in the control section after the first "B" pulse after relay 1512 operates.

Since 0's are to be written or remain in the third and fourth control address channels, the third and fourth "A" keys will either be positioned to write 0's or left unoperated. If the operator chooses to operate these keys to the "0" position then 0's will be written on top of the 0's already present in the manner similar to that described above for writing the ones except that the lower amplifier section of amplifiers 1251 and 1252 will be employed. Consequently, the output pulse applied to the writing heads 83 and 84 will be of the opposite polarity due to the output transformers of these amplifiers, which transformers correspond to output transformer 1230. The phase reversal is due to the fact that the windings corresponding to tubes 1225 and 1226 are opposite in phase similar to a push-pull output transformer. Consequently, when tube 1225 conducts, an output pulse of one polarity is induced in the output winding of transformer 1230 while, when tube 1226 conducts, an output pulse of the opposite polarity is induced in the output winding of the output transformer 1230. The corresponding transformers in the other writing amplifiers 1250, 1251 and 1252 are similarly constructed and connected.

As described above, the application of the "A" pulse through the coupling condenser 724 is ineffective because the left-hand section of tube 715 is conducting and the lower terminal of diode 716 is at ground potential. Consequently, the application of the selected "A" pulse through the coupling condenser 725 results in the application of a positive voltage to the left-hand terminal of diode 711. Then, when the immediately succeeding "B" pulse is received over conductor 886 it is applied to the control grid of tube 713 through the voltage dividing resistors 728 and 729. Consequently, an output pulse is repeated across the output cathode resistor 730 of tube 713 which pulse is applied to the gate and output amplifiers shown in FIG. 11. However, these amplifiers may respond to this pulse as described hereinafter. Since the output of these amplifiers is not employed at the present time their operation is not described at this place. The output from tube 713 is also applied to coupling condenser 743 to the grid of the left-hand section of tube 719. This tube repeats the pulse to the upper winding of the blocking oscillator coil 721 which in turn initiates the operation of the blocking oscillator section of tube 719. As a result, positive pulse is repeated across the output cathode resistor 727 and applied over conductor 745 to the writing amplifiers, and also to the gate and output amplifier circuit shown in the upper portion of FIG. 16. This pulse is applied through the coupling condenser 1644 and the diode 1641 to the left-hand grid of tube 1642. It is noted that inasmuch as the lower terminal of diode 1640 is connected to a source of positive voltage this diode will have a high resistance to positive pulses and will not materially prevent the application of the positive pulse to the grid of the left-hand section of tube 1642.

Tube 1642 has its two sections connected in a single cycle multivibrator and is arranged so that a pulse of relatively short duration of the order of several microseconds will be sufficient to initiate operation of the circuits of this tube and thereafter the circuits will remain in their actuated condition for a much longer interval of time sufficiently long to operate a relay such as relay 1644 in the manner to be now described.

Tube 1642 is arranged so that the right-hand section is normally conducting current. Upon the application of a positive pulse to the left-hand grid of this tube, the flow of currents through the left-hand section is initiated which in turn, due to the cross-coupling arrangement, interrupts the current flowing through the right-hand section. The current then continues to flow through the left-hand section for a period of time equal to approximately fifteen milliseconds in an exemplary embodiment of this invention. During the time current does not flow through the right-hand section of tube 642, the grid of the left-hand section is at a relatively high positive voltage. Consequently, current continues to flow through this section. In addition, the grid of the left-hand section is connected to the grid of amplifier tube 1643 and as a result during the time the grid of the left-hand section of tube 642 is positive the grid of tube 643 is also positive. Consequently, current flows in the anode cathode section of tube 643 during this time. The circuit path for the anode cathode current of tube 643 extends from battery through the upper outer operated contacts of 1621 to the winding of relay 1644 to the anode of tube 1643 and then to the grounded cathode of this tube. As a result, relay 1644 operates and in operating completes a circuit for maintaining it self-operated independently of tube 1643 from ground through its armature and operated contacts and winding to battery through the upper outer contacts of relay 1621.

Relay 1644 in operating also completes a circuit through the upper outer contacts of relay 1630 for lighting lamp 1789 which indicates to the operator that the information entered upon the keys of FIG. 17 has been recorded in the selected position on the drum.

The selected "B" output pulse from the cathode of tube 713 in response to the operation of the circuits as described above in addition to being applied to the gate and output amplifiers represented in FIG. 11 over conductor 732, is also applied to the right-hand terminal of condenser 1445. During normal operation of the system this pulse will be applied to this terminal long before the delay interval of the single cycle multivibrator 1424 has terminated. Thus, under the assumed condition, the positive voltage applied to the right-hand terminal of condenser 1445 is not transmitted through the diode 1431 to the anode of the right-hand section and to the grid of the left-hand section of tube 1430. The capacity of the coupling condenser 1445 is small and the resistance of resistor 1452 is small so the "B" output pulse is differentiated and a positive pulse of short duration applied to the right-hand terminal of diode 1431. Because this positive pulse is not readily transmitted through the diode 1431 because the left-hand section of tube 1430 is conducting at this time, this short positive pulse does not change the conductions with tube 1430. At the end of the "B" pulse a negative pulse of short duration is applied over the above-described circuit to the anode of the right-hand section and to the grid of the left-hand section of tube 1430. The application of a negative pulse to this grid interrupts the flow of current through the left-hand section of tube 1430 and initiates the flow of current through the right-hand section of this tube. As a result, the grid of the left-hand section becomes more negative and the grid of the right-hand section becomes more positive. The left-hand section of tube 1432 repeats this potential as a negative voltage in its output circuit which in turn applies a negative voltage to the control grid of the right-hand section of tube 1432. The right-hand section of tube 1432 thereupon removes the high positive voltage from its cathode resistor 1433 and thus from the output conductor 1441. As a result, the grid of tube 1414 is restored to approximately ground potential with the result that the output over conductor 1443 is restored to its initial condition so that tube 712 will not respond to the next succeeding or any of the other succeeding "A" pulses. The next "A" pulse, however, is applied to the coupling condenser 724 to the left-hand grid of tube 715 which initiates the flow of current through this section and interrupts the flow of current through the right-hand section of tube 715. Consequently, the positive voltage is removed from the left-hand terminal of diode 711. As a result, tube 713 will not respond to the next succeeding or any of the other succeeding "B" pulses received over conductor 886 from the "B" pulse generator of FIG. 8. Normally, before the operator or attendant observes the lamp 1789 and actuates the keys as a result thereof the single cycle multivibrator circuit comprising tube 1424 will have restored to its initial condition. The application of a pulse through the diode 1428 and thus to the circuits of tube 1430 will under these circumstances produce no effect upon these circuits since they have been restored as described above.

The operator or attendant upon noting the lighted lamp 1789 will again operate the keys of FIG. 17 to control the recording of additional information in the drums. The operator will first release key 1721 which in turn interrupts the circuit over conductor 1794 and thus releases relay 1513. Relay 1513 in releasing removes battery from the gate and output amplifier tubes of FIG. 11 and thus permits any of the relays such as relay 1515 which may have been operated to release. The release of relay 1513 also removes ground from conductor 1422 thus restoring the start circuit of FIG. 14 to its initial condition. The removal of ground from conductor 1422 permits condenser 1434 to be charged negatively. The change in charge on this condenser and thus the change in voltage of conductor 1422 is retarded due to condenser 1434 and resistors 1437 and 1438. This slow change in voltage is not passed by or is attenuated by the condensers 1435 and 1436 and resistors 1439 and 1440. This negative voltage is also further prevented from effecting the operation of tubes 1420 or 1424 by the diodes 1421 and 1423 which are poled so as to present a high impedance to negative voltage pulses.

The release of key 1721 also interrupts the operating circuit of relay 1621 which relay releases and disconnects the output of the writing amplifiers from the combined reading and writing heads 81 through 84. The release of relay 1621 also interrupts the above-described locking circuit of relay 1644 thus permitting relay 1644 to release and the circuits of the single cycle multivibrator 1642 to be restored to their initial condition. Relay 1644 releases and extinguishes lamp 1789.

The operator has now selected a blank or unused item area or position on the drum and has recorded in the address control portion thereof a recording code. The operator will record such a recording symbol in only one control address position on the drum at a time. It has been assumed that this code comprises marks or ones in channels under heads 81 and 82 and blanks or spaces in channels under heads 83 and 84. The particular blank area selected is the first one which was presented under the pickup heads 81 through 84 after the key 1721 was operated by the operator or attendant and relay 1513 operated in response thereto. The operator or attendant will then restore the keys 1781, 1782, etc., employed to record this code in channels under the pickup heads 81 through 84 comprising a control address. This record code is then left in the drum and employed to record the additional information for the translation item until all of the information of the translating item in question has been recorded in the drum.

In order to record this additional information the operator or attendant will actuate or leave key 1788 actuated and will actuate keys 1731 and 1732 but leave keys 1733 and 1734 unactuated. As a result, ground potential is applied to leads CA1 and CA2 to the control match circuit while no such potential is applied to leads CA3 and CA4. Consequently, voltage of approximately 30 volts is applied to these leads by the control match circuit of FIG. 10. Thus each time the recording address previously recorded in one translation item area passes under the pickup heads 81 through 84, an output pulse will be obtained which may be employed to record further information of the translating item.

In addition to operating the keys 1731 and 1732 the operator will operate the keys 1781, 1782, etc., 1793 and 1794, etc. in accordance with information to be recorded in any of the other tracks of the drum in the particular translation area previously selected. Assume that it is desired to so operate the keys to record the information sequentially in each of the tracks. The operator will then operate key 1701 which will cause relay 1601 to operate and connect the output of the writing amplifiers to the first four combined recording and pickup heads 1 to 4 of FIG. 3.

The operation of relay 1601 also applies anode potential to tube 1643 and thus energizes this tube for operation and the subsequent operation of relay 1644 in the same manner that the operation of relay 1621 energized tube 1643.

The operation of key 1701 again applies ground to conductor 1794 which closes relay 1513 to again operate and apply anode potential through the relay such as 1515 to the gate and amplifier circuits shown in FIG. 11. The reoperation of relay 1513 also again applies ground to the conductor 1422 which in turn initiates operation of the start circuit. The start circuit in turn applies battery or a more positive voltage to conductor 1441 extending to the diode 1415. In this case under usual conditions a match will not be immediately obtained by the control match circuit of FIG. 10 because the drum must now rotate until the recording code comprising marking in channels under heads 81 and 82 and spacing in channels under heads 83 and 84 starts to pass under the recording heads 81, 82, 83 and 84. The operation of the control match circuit in selecting this particular code combination will now be described. As indicated above leads CA1 and CA2 have ground applied to them and the leads AD81 and AD82 have the output from amplifiers DA81 and DA82 applied to them.

These output amplifiers are similar to the amplifier DA1 shown at 312 of FIG. 3. This amplifier is also similar to the time amplifier 811 shown in FIG. 8 and described above. The output on the AD1 lead is approximately 30 volts positive as a recorded "one" starts to pass under the head 1 and is substantially at ground potential at other times including the times which zeros recorded in this track pass under the recording and reading head 1. Likewise, the output from each of the amplifiers DA81, DA82, DA83 and DA84 is approximately 30 volts positive when a recorded "one" starts to pass under the respective combined reading and writing heads 81, 82, 83 and 84 and is substantially zero or ground potential at other times including the time during which a zero passes under these heads. Thus, the output on leads AD81 and AD82 will be at substantially ground potential except during the time the ones previously recorded in the corresponding tracks pass under respective heads at which time the voltage on these leads will be approximately 30 volts. With the voltage on these leads at ground potential and the voltage on leads CA1 and CA2 also at ground potential the voltage at the midpoints 1061 and 1062 between the respective resistors 1071, 1081 and 1072 and 1082 remains at ground potential. These resistors all have substantially the same resistance in an exemplary embodiment of this invention. However, when +30 volts is applied to leads AD81 and AD82 by the amplifiers DA81 and DA82, the midpoints 1061 and 1062 rise to substantially 15 volts positive. The same voltage conditions are applied to the leads AD84 and AD83 by the output amplifiers DA83 and DA84. However, leads CA3 and CA4 do not have ground applied to them by the keys 1733 and 1734. Consequently, these leads are maintained at approximately 30 volts positive from a positive voltage source through respective resistors 1093 and 1094. Consequently, when the zeros recorded in the drum are passing under the pickup heads 83 and 84 and ground is applied to leads AD83 and AD84, the midpoints 1063 and 1064 will be at approximately +15 volts. However, if ones recorded in the drum should pass under pickup heads 83 and 84, the output from the corresponding amplifiers will be approximately 30 volts, so that approximately 30 volts would also be applied to leads AD83 or AD84, or both of them, with the result that one of the midpoints 1063 or 1064, or both of them, would be at approximately +30 volts.

Thus the voltage of the midpoints 1061 through 1064 may be either at ground potential, approximately 15 volts plus or approximately 30 volts plus. When the code passing under all four of the pickup heads corresponds to the code output potentials applied to the leads CA1 through CA4 by the keys 1731 through 1734, then the voltage of all of the midpoints 1061 through 1064 rises to approximately 15 volts. At all other times some one of these midpoints will either be at ground potential or at substantially 30 volts positive.

The midpoints 1061 through 1064 are each connected to two diodes which are oppositely poled. For example, each of these midpoints is connected to diodes 1041, 1042, 1043 and 1044 which diodes are in turn connected to the right-hand grid of tube 1030. The midpoints are also connected to diodes 1051, 1052, 1053 and 1054 which diodes are also all connected to the grid of the left-hand section of tube 1030. The grid of the right-hand section of tube 1030 is biased by the voltage dividing resistors 1035 and 1036 to a voltage between 15 and 30 volts, while the grid of the left-hand section of tube 1030 is biased to a voltage of slightly between ground and 15 volts by the voltage dividing resistors 1037 and 1038. The diodes 1051 through 1054 are all connected and poled in such a direction that all of the midpoints 1061 through 1064 must rise to approximately 15 volts or higher before the voltage of the grid of the left-hand section of the tube 1030 rises to approximately 15 volts. At all other times some one or more of the diodes 1051 through 1054 will be connected to a midpoint having substantially ground potential applied to it and under these circumstances the impedance of such diode or diodes will be sufficiently low to maintain the grid of the left-hand section of tube 1030 at substantially ground potential. The diodes 1041, 1042, 1043 and 1044 however, are connected between the respective midpoints and the right-hand grid of tube 1030 in such a manner that if the voltage of any one of the midpoints rises appreciably above substantially 15 volts, then the grid of the right-hand section of tube 1030 likewise rises to this higher voltage which as described above will be approximately 30 volts.

The cathodes of both sections of tube 1030 are connected to a source of negative voltage through relatively high resistances. They are also connected through diodes 1033 and 1034 to potentiometers. These diodes are so poled that they present a very high impedance so long as the voltage of the respective cathodes is below the voltage of the adjustable tap of a potentiometer to which they are connected. The left-hand terminal of diode 1033 is connected to a potentiometer which is adjusted to apply a voltage between ground and 15 volts (plus the tube bias) to this diode. As a result, so long as the cathode of the left-hand section of tube 1030 remains below the voltage of its left-hand terminal the diode 1033 has a high impedance. When the voltage of the left-hand cathode of tube 1030 rises above said voltage, then the impedance of the diode 1033 becomes quite low. Thus so long as the voltages applied to the left-hand grid of tube 1030 are below the voltage of the left-hand terminal of diode 1033, i.e., approximately 15 volts, the left-hand section of this tube operates as a cathode follower with a relatively high cathode resistor and as a result voltage changes below said voltage applied to the left-hand grid of tube 1030 produce minor current changes in the output of tube 1030. However, when the voltage rises above approximately 15 volts then the impedance of the diode 1033 falls to relatively low value so that a large current abruptly starts to flow in the anode circuit of the left-hand section of tube 1030 with the result that a negative output pulse is applied to the coupling condenser 1039 to the left-hand grid of tube 1032.

The potentiometer to which the right-hand terminal of diode 1034 is connected is set at a positive voltage such that the diode 1033 has a high impedance until the right-hand grid of tube 1030 has a voltage more positive than +15 volts applied to it. At this time, the diode 1034 changes from a high impedance to a low impedance due to the fact that the right-hand cathode rises to a positive voltage above the voltage applied to the right-hand terminal of this diode. As a result, at this time, a relatively large current flows in the anode-cathode circuit of the right-hand section of tube 1030 and produces a large voltage drop across the anode resistor thereof. As a result, a negative voltage is applied to the left-hand grid of tube 1030 which voltage overcomes the voltage derived from the diodes 1051 through 1054 and the voltage divider comprising resistors 1037 and 1038. The voltage applied to the left-hand terminal of diode 1033 and to the right-hand terminal of diode 1034 is selected so that minor variations in voltage of the grids of tube 1030 near ground potential and near +15 volts will not produce substantial changes in the operation of the circuit and at the same time the circuits will clearly recognize and respond to the three different voltage conditions of substantially ground potential; substantially +15 volts; and substantially +30 volts applied to the grids of tube 1030.

Thus so long as any one of the center points 1061, 1062, 1063, or 1064 remains at substantially ground potential the grid of the left-hand section of tube 1030 cannot rise appreciably above ground potential. Likewise, so long as any one of the center points 1061 through 1064 rises to a voltage more positive than approximately 15 volts, which voltage in an exemplary embodiment is in the neighborhood of 30 volts, the flow of a relatively large current is abruptly initiated to the right-hand section of tube 1030 which causes a negative voltage to be applied to the left-hand grid of this tube through the coupling condenser 1040 which negative voltage also prevents the flow of any significant current in the anode-cathode circuit of the left-hand section of tube 1030. However, in case all of the midpoints 1061 through 1064 rise only to approximately 15 volts plus, indicating that the code elements stored in tracks 81 through 84 on the magnetic drum correspond with the code elements set on the keys 1731 through 1734, a voltage approximately 15 volts is applied to the left-hand grid of tube 1030 which voltage causes an abrupt increase in current to flow through the left-hand section of this tube which in turn applies a negative voltage through the coupling condenser 1039 to the left-hand grid of tube 1032. As a result, the flow of current through this section of tube 1032 is interrupted and a positive voltage applied to the right-hand grid of tube 1032. The right-hand section of tube 1032 operates as a cathode follower and applies a corresponding positive voltage to the output conductor 1011. This positive voltage is thus applied to the right-hand terminal of diode 1417.

At this time, positive voltage is also applied to the right-hand terminal of diode 1416 and the lower terminal of diode 1415. Consequently, the grid of tube 1414 rises to a sufficiently positive voltage to apply positive voltage to the conductor 1443. This positive voltage is applied to the time gate circuits of FIG. 7 and causes the "A" pulse, which occurs during the time this positive voltage is applied to conductor 1443, to be repeated by the driver tube 718 and the next succeeding "B" pulses by the driver tube 719. As a result, the circuits respond as described above and cause the writing amplifiers to record the signals in the first four tracks of both the "A" and the "B" slots of the selected translation item area, cause lamp 1789 to light, and cause the various circuits to be restored to their initial condition thereafter in a manner described above.

The operator will then release key 1701 which releases various of the relays described above whereupon the circuits are again ready to record other information of the translation item. The above cycles of operation are then repeated by the operator by operating the appropriate keys in each instance until all of the information of the translation item has been entered in and stored upon the magnetic drum. Thereafter, the operator will again reset the keys and this time she will set the keys 1781 and 1782 to record zeros, and the other two keys for recording under control of the "A" pulses to record ones. Thereafter, the operator will again actuate key 1721. When the recording code, namely, "one" in channels under heads 81 and 82 and zeros in channels under heads 83 and 84 of the drum pass under the pickup coils 81 through 84, the writing amplifier circuits will be actuated so as to change the signals recorded in these channels. The recording signal is thus erased and a translation available signal substituted or recorded in place of it. This translation available signal or code comprises zeros in channels under heads 81 and 82 and ones in channels under heads 83 and 84. These symbols recorded in the control channel indicate that a translation has been completely recorded in the drum and is available for translation purposes.

In a manner similar to that described, the operator or attendant may record the various translation items required for the particular switching station and equipment located thereat. If, at any time during the recording of any address the operator should discover a mistake she may readily correct the mistake by merely resetting the appropriate keys and causing the correct information to be recorded which recording erases the incorrect or undesired information.

It is to be noted that the exact location of any item on the drum is indeterminate but since this item may be readily found and identified as will be described hereinafter, it is not essential that elaborate equipment be provided to position any translation item in any predetermined area on the drum. Thus, the expense of this equipment is eliminated. Furthermore, the administration and the expense of keeping track of locations of various translation items is also eliminated. It is to be noted however, that any of the translation items may be located when desired and changed or removed as will be described hereinafter.

*Changing or canceling the translation*

When it is desired to change or cancel a translation on a drum the translators employing the drum in question are taken out of service or the translators employing the drum in question are made busy and thus taken out of service. Key 1788 is restored or maintained in a normal condition so that relay 1512 does not operate. Key 1785, or the corresponding key for the particular drum to be changed, is operated which causes relays 1630 and 1511 or the corresponding relay of the other drum circuits to operate. These relays perform the functions described above, namely relay 1630 connects the code keys 1781, 1782, etc., 1793, 1794, etc., to the input of the writing amplifiers of FIG. 12; connects the windings of the relays 1601 through 1621 to distributor keys 1701 through 1721; and connects anode battery to the anode of tube 1643 through the winding of relay 1644.

The operation of relay 1511 connects the address code keys 1741 through 1778 to the windings of the address code relays of FIGS. 5 and 9. The operation of relay 1511 also connects the control address code keys 1731 through 1734 to the control match circuit of FIG. 10.

The operator or attendant will then actuate the translation address keys 1741 through 1778 in accordance with the address or identification of the translation to be altered or canceled. These keys simulate the information normally supplied to the drum circuit from the decoder which information normally represents the dialed area or office or dialed area and office codes. The operator or attendant will also actuate the control address keys 1731 to 1734 in accordance with the code representing a translation available, i.e., 1731 and 1732 normal representing "zeros" and 1733 and 1734 operated representing "ones."

In altering or canceling a translation the attendant will first change the control tracks under heads 81 through 84 and then make a desired change or changes in the remaining tracks. In order to change these tracks the operator will, in addition to operating keys 1731 through 1734 and keys 1741 through 1778 as described above, also operate the code keys 1781, 1782, etc. in accordance with the code of the subsequent operations to be performed. If for example, it is desired to merely cancel or render ineffective any translation item the operator will operate all four of these keys to cause zeros or blanks to be recorded in the control track cells of the translation in question. If for example, it is desired to alter the translation then the operator will actuate the code keys 1781, 1782, etc. to enter in the control tracks a "record" combination as pointed out above.

It is also possible to record other codes in the control tracks which other codes may be employed for other purposes. For example, if it is desired to render certain translation ineffective for a period of time then it is only necessary to change the control tracks to a different code and then when it is later desired to restore the translation without further change, the control track will again be altered to render the translation available for translation. Thus, it is possible to employ different codes on the control tracks to classify the various translation items so that they may be rendered effective or ineffective and so that translations can be readily substituted one for another at different times of the day at different seasons or for other special circumstances.

While any portion of a translation item may be readily changed, assume for purpose of illustration, that it is desired to merely change certain of the translated output information of a predetermined translation. Under these circumstances the keys 1781, 1782, etc. are operated so that they will enter a record signal or code in the control tracks which signal or code as pointed out above comprises plus signals or ones in channels under heads 81 and 82 and blanks or zeros in channels under heads 83 and 84. In other words, the polarity of signals recorded in all four tracks is reversed from the polarity of the signals representing a translation item. The operator or attendant will also actuate the control address keys 1731 through 1734 to represent a translation available item, namely, keys 1733 and 1734 being operated and keys 1731 and 1732 being normal. The operator will also restore key 1788 to normal or have this key normal and operate the translation address keys 1741 through 1778 to represent the address of the translation which it is desired to change. The operator will then actuate key 1721 which key applies ground through the translation address keys 1741 through 1778 to cause the corresponding address code relays of FIGS. 5 and 9 to be operated. These relays in turn apply grounds to conductors extending to the various address match circuits in the same manner that the keys of the control address 1731 through 1734 apply ground to the control match circuit as described above. The operation of the address code relays of FIGS. 5 and 9 to represent an address completes a circuit for the operation of the check relay 1513. Improper operation of these relays, that is, operation of too many or too few of such relays will not complete the circuit for operating the relay 1513. The response of relay 1513 to the operation of the code address relays to represent a code address will be described in greater detail hereinafter with reference to the making of a translation.

The operation of relay 1513 applies ground to lead 1422 which discharges the upper terminal of condenser 1434 and in effect applies a positive pulse of short duration through the differentiating network comprising condenser 1435 and resistors 1439 to diode 1421 and overcomes the negative bias applied to this diode by the voltage divider resistors 1439. As a result the impedance of this diode falls to a sufficiently low value to transmit the positive pulse to the left-hand grid of tube 1420. A similar positive voltage is applied through the differentiating network comprising condenser 1436 and resistors 1440 to diode 1423 which in turn transmits this positive pulse to the left-hand grid of tube 1424. These positive pulses cause the single cycle multivibrator circuits of these tubes to have the conduction within them reversed. That is, conduction starts to flow through the left-hand sections of both these tubes and is interrupted through the right-hand sections. As a result a positive pulse is applied through the coupling and differentiating condenser to the circuits of tube 1430. The circuits of tube 1430 do not respond (1) because they are insensitive to positive pulses and (2) because the diode 1429 tends to reduce alternate positive pulses.

A short interval of time later when the succeeding "B" pulse is received over conductor 886, conduction is restored to the right-hand section of tube 1420. As a result, a positive voltage is applied to the left-hand grid of tube 1425 which section then conducts current and repeats a negative pulse through the right-hand section of this tube to the double stability circuit involving tube 1430. As a result, the conductions in this tube are reversed i.e., the left-hand section conducting and the right-hand section not conducting so that a positive pulse is applied on conductor 1441 to the lower terminal of the diode 1415. This positive pulse will partly enable the grid circuit of tube 1414 so that this tube will conduct when the positive voltage is also applied to the right-hand terminals of diodes 1416 and 1417. Until the positive voltage is applied to the lower terminal of diode 1415, however, tube 1414 does not conduct independently of any normal operating voltages applied to the right-hand terminals of the diodes 1416 and 1417.

Meantime, however, relays of FIGS. 5 and 9 have operated and grounded leads to the address match circuits whereupon the match circuits search for a corresponding address stored upon the address section of each of the translation items recorded in the drum. These match circuits as shown in FIGS. 6 and 10 operate in the same manner as the control match circuit shown in the lower part of FIG. 10 and described hereinbefore. These match circuits respond to each address of each of the translation items recorded in the drum and in normal operation of the system they respond to every address during each revolution. After relay 1513 operates and applies positive battery to the lower terminal of the diode 1415 the next time the signals from the address section of the drum correspond with the setting of the address code relays of FIGS. 5 and 9, a positive pulse will be obtained from the match circuits. Each time the signals from any of the subgroups of channels on the drum correspond to the setting of one of the subgroups of FIGS. 5 and 9 a positive pulse is obtained from the individual address match circuit. A positive pulse will be obtained from all of these address match circuits only for the translation items which have the same address code as represented by the keys 1741 through 1778 and the setting of the corresponding relays of FIGS. 5 and 9. Thus, as the drum rotates positive output pulses are obtained from one or more of the address match circuits until the address of the desired translation is read by the output circuits from the drum at which time a positive pulse is obtained from all of the address match circuits. These positive pulses are applied through the individual diodes 1418 and through the common diode 1412 to the control grid of tube 1413. So long as any one of the output circuits from the address match circuits is not at approximately 30 volts, i.e., is at substantial ground potential, the voltage of the common point of the diodes 1418 will remain at substantial ground potential. However, whenever all of these address match circuits have found a match then the output of all of the match circuits will be at approximately +30 volts which voltage is relayed through diodes 1418 and the diode 1412 to the control grid of the address combine circuit 1413. It is to be noted that the diodes 1418 are all connected in such a manner that the input to all of these diodes must be at a more positive excursion before a pulse is relayed through these devices of the grid circuit of tube 1414. In other words, the diodes 1418 are connected in a circuit sometimes called an "and" circuit. The diodes 1412 and 1411 however are connected and poled in the opposite direction so that they operate as a so-called "or" circuit and which positive voltage applied to the left-hand or lower terminals of either of these devices is once applied to the control grid of tube 1413.

Likewise, the setting of keys 1731 through 1734 causes a positive output voltage to be obtained from the control match circuit each time a translation available item indication passes under pickup heads 81 through 84, respectively. When the address is found and the control match also has a positive output voltage, as described above, the match combining tube 1414 has a positive potential applied to its control grid in a manner similar to that described above and causes a positive output voltage to be applied to conductor 1443.

The positive output voltages from the various channel amplifiers associated with the pickup heads of the drum circuit rise to their positive excursion or peak appreciably before the center of the magnetized magnetic area passes under the center of the pickup coils. By employing fast operating circuits the character of the storage element in the drum surface may be ascertained or employed in control circuits which cause the pulse of reverse polarity to be recorded in the drum surface.

Thus, the positive pulse applied to the conductor 1443 occurs slightly before the center of the magnetic recording area of the drum passes the center of the recording pole tips. As a result, positive voltage is applied to the left-hand terminal of diode 710 before an "A" pulse is applied to conductor 866. When the "A" pulse is applied to conductor 866 this "A" pulse is repeated by tube 712 and applied through the coupling condenser 725 to the right-hand grid of tube 715 which in turn causes reversal of conduction within the sections of the double stability circuit comprising tube 715. In addition, the selected "A" pulse is applied to the left-hand grid of the driver section of tube 718 which in turn applies a pulse to the blocking oscillator coil 720 and causes the right-hand section of tube 718 to repeat a pulse of appreciable magnitude in its output cathode circuit. This pulse is applied to the upper section of amplifier 1200 and causes a one to be recorded over the zero read the instant before in the control track in question. Since the double stability circuit of tube 715 is operated to the opposite condition to that originally prevailing, the next "B" pulse from over lead 886 initiates a flow of current through tube 713 which pulse is then repeated by both sections of tube 719 and applied to the writing amplifiers of FIG. 12. As a result the writing amplifiers will write the signals under control of the keys 1793, 1794, etc. and in addition initiate the operation of the circuits of tube 1614 which in turn cause tube 1643 to supply enough power to actuate relay 1644. Relay 1644 operates and lights the lamp 1789 indicating that the proper code has been entered in the control tracks to indicate that the operator may then change the setting of the keys of FIG. 17 to record or change the information in other tracks. Both the selected "A" pulse and the selected "B" pulse are applied to the gate and output amplifier circuits and actuate these circuits in the manner described hereinafter. Such operation performs no useful function at this time.

The selected "B" pulse is also employed to restore the start circuit in the manner described above.

As pointed out above during the time it is desired to record information at any area of the magnetic drum surface a recording code is entered upon the control tracks. Only one such code is entered upon any of the record tracks at any one instant of time. Consequently, by then operating the control address keys 1731 through 1734 to represent the recording code and actuating the address cancel key 1788 the control code may be employed to change any of the other cells or areas of the translation item in question including the information recorded in the address section of the translation. The fact that some other information is recorded in any or part of the areas of this translation is of no consequence because the circuits in operating and recording new information in effect destroy or cancel the old information recorded in the same areas on the drum.

The operator after having manipulated the keys in a manner similar to that for entering a new translation will then again restore the control code to the translation available code after which this translation may be checked in any suitable manner and thereafter employed to control a decoder and thus the marker and other equipment which establishes paths through the switching equipment and transmits the dial information to the toll or other switching center.

Both the output translated signals as well as the address code sections may be changed in a manner described herein. In case it is not desired to change the address the canceled address key 1788 need not be operated, in which case the entire address plus the control address will be employed to select the translation item in which the changes have to be made.

As pointed out above, if it is merely desired to cancel the translation then blanks are written in the control tracks so that the translation item space will become available when it is desired to write another translation on the drum in the manner described above. Likewise, any other special codes may be similarly recorded in the control tracks of any of the translation items and then either the control track alone or the address and the control track employed to find the particular translation item to alter either the information of the address, the translated information or the information in the control tracks of the selected translation item in the manner described above.

*Performing a translation*

After the information relating to the various translation items has all been entered on the drum in the manner described above and the control address of each one changed to indicate that the translation is available for use, the translator is ready for use in directing calls through the telephone switching center. Thereafter the various decoders served by a drum and related equipment may be put in service and the make-busy means removed from these decoders. As a result, the decoders will employ the drum translator for obtaining the desired translations when establishing each telephone transmission path through the switching center. During the establishing of such path or connection the decoder will actuate the interconnecting relays in the manner described in the above-identified copending application of Gooderham-Jacobitti-Myers-Shipley-Strickler Serial No. 286,267. The interconnecting relays comprise relays 1811, 1812, 1813, 1911, 1912, 1913, 1914, 2011, 2012, 2013, 2111, 2112, 2113, 2211, 2212 and 2213 shown in FIGS. 18, 19, 20, 21 and 22. These relays correspond to relays HC1, HC2, and HC3 of FIG. 130, relays HC4, HC5, HC6, and HC7 of FIG. 144, relays HC8, HC9, and HC10 of FIG. 158, relays HC11, HC12, and HC13 of FIG. 172 and relays HC14, HC15, and HTR of FIG. 184 of said above-identified application Serial No. 286,267. There is a similar set of relays in each decoder for the home foreign area translations and still other connecting relays for connecting to the foreign area translation apparatus. The circuit of the windings of these relays and the decoder connection of their contacts have not been shown in the drawing because the circuits for the windings of these relays and the decoder connections to the contacts of them are shown and described in detail in the above-identified application of Gooderham-Jacobitti-Myers-Shipley-Strickler. The circuits of the windings of these interconnecting relays and the connections to the contacts thereof in the decoder operate in substantially the same manner as described in said above-identified copending application and cooperate with the circuits of the magnetic drum translator described herein in substantially the same manner as the decoder connector circuits and decoder connections to the contacts of these relays operate in combination with the card translator as described in said above-identified copending application.

Upon operating the interconnecting relays in the manner described in said above-copending application the decoder transmits the dialed area codes to the translating equipment. In the first instance, the decoder transmits only the first three dialed digits which usually are the area code and asks for a translation of these digits. Sometimes such a translation is all that is required and other times the translated information returned to the decoder will indicate that the decoder should be obtain six digits, that is, the area code and also the office code and then seek another translation. In the case of alternate routes the decoder may be required to obtain still another translation and in the case of large trunk groups still other translations may be necessary as described in the above-identified copending application.

Also, as described in the above-identified copending application each symbol or digit of the area code is represented by ground applied to two out of five leads. In other words, the two-out-of-five code is employed to convey information from the decoder to the translator. The identical codes are employed in the exemplary embodiment of the translator described herein for conveying information from the decoder to the translator.

Thus five relays and a conductor individual thereto to the decoder are provided for registering the identity of each of the dialed digits. Relays 510, 511, 512, 514 and 517 are employed to register and store the identity of the first symbol or digit of the dialed call number. Relays 520, 521, 522, 524 and 527 are provided for registering and storing the identity of the second digit or symbol and relays 530, 531, 532, 534 and 537 are similarly employed to store and register the identity of the third symbol or digit which three symbols or digits usually comprise the area code of the office code. In addition, three additional sets of relays are provided; relays 540, 541, 542, 544 and 547, also relays 950, 951, 952, 954 and 957, as well as relays 960, 961, 962, 964 and 967 are provided to enter and register and store the identity of the next three symbols or digits of the called subscriber's station identification which digits are usually referred to as the office code. The first two of these digits are usually represented by letters of the alphabet and the third one by one of the numerals from 0 to 9.

In the arrangement described in said above-identified copending application as well as the translator described herein, the area codes may be readily distinguished from the office codes by the identity of the digit or symbol in the middle position. In the area codes a zero or one are the only two digits employed in the middle position, while in the office codes these two numerals, namely zero and one are not employed in the middle position. Thus, it is possible to prevent confusion as to these codes.

In addition to the above six sets of relays for registering the identity of six different symbols or digits of the called station identification an additional group of relays comprising relays 991, 992, 993, 994, 995, 996, 997, 998 and 999 are provided to register other information which is employed for control and checking purposes which information is received from the decoder. Thus, relay 997 is operated on calls which must go through an additional switching point. The operation of this relay indicates that a special group of high quality trunks is to be employed in building up the connection. Relay 996 is employed where it is not essential that such high grade trunks be employed in building up the connection. Relay 998 is employed to indicate that an alternate route translation is desired. This translation is employed when all of the trunks of the trunk group designated in the first translation are busy. In addition, relay 991 is operated when it is desired to have a 6-digit translation. Likewise, relay 999 is operated when a 6-digit translation is requested by the decoder. When only a 3-digit translation is requested relay 992 is operated, while relays 991 and 999 remain unoperated. Furthermore, relays 993, 994 or 995 may be operated when different portions of a large trunk group are to be tested for an idle trunk and the proper translation of the idle trunk obtained from the translator.

Assume for the purpose of illustration that upon the operation of the decoder connector relays the input-output circuits of the drum circuit are idle so that ground is applied over conductor 2214 to the decoder circuit. Ground applied to this conductor indicates that all of the output relays are normal. The circuit for this ground extends from ground to the upper break contacts of relay 1514 and the normal break contacts of the output relays 1551, 1552, 1553, 1554, 1555, 1556 and 1557 and then over conductor 2214 and through the operated contacts of relay 2211 to the decoder. This circuit also extends through the break contacts of the other of the output relays not shown in FIG. 15 but provided in a translator circuit as indicated in FIG. 15. Ground on this lead causes the decoder to advance and apply ground to the input information or address leads which grounds represent the area code and the station code of the called station as transmitted to the decoder from the calling subscriber in the manner indicated in the above-identified copending application, Serial No. 286,267.

Assume for purpose of illustration that a six-digit translation will be requested and that relay 997 will also be operated by the decoder to indicate that the special high grade trunks are to be employed in establishing the connection through the system. Under the assumed circumstances two out of the five relays of each of the six groups of five relays will be operated. Thus two of the relays 510, 511, 512, 514 and 517 will be operated. Assume for purpose of illustration that the first two relays 510 and 511 are operated. Assume that the last two relays 524 and 527 of the next group are operated and that the middle and last relay of the other groups are operated, namely relays 532, 537, 542, 547, 952, 957, and 962 and 967 are all operated by the decoder. Under these circumstances, the circuit may be traced from ground 909 through the upper break contacts of relay 960, lower inner break contacts of relay 961, the second set of operated contacts from the top of relay 962, third set of unoperated contacts from the top of relay 964, the upper outer operated contacts of relay 967, the upper outer operated contacts of relay 957 and the third set of unoperated contacts from the top of relay 954, and second set of operated contacts from the top of relay 952 and the lower inner break contacts of relay 951, the upper inner break contacts of relay 950, the upper inner break contacts of relay 540, the lower inner break contacts of relay 541, the second set of operated contacts from the top of relay 542, the third set of normal contacts from the top of relay 544 and the upper outer operated contacts of relay 547, the upper operated contacts of relay 999, conductor 504, the upper inner break contacts of relay 530, the lower inner break contacts of relay 531, the second set of operated contacts from the top of relay 532, the center set of upper break contacts of relay 534 and the upper outer operated contacts of relay 537, the upper outer operated contacts of relays 527 and 524, the upper outer break contacts of relay 522, the lower inner break contacts of relay 521, the upper inner break contacts of relay 520, the upper outer operated contacts of relay 510, the upper inner operated contacts of relay 511, the lower inner break contacts of relays 512 and 514, the upper inner break contacts of relay 517 and then over conductor 501 through the second set of operated contacts from the top of relay 991, lower inner break contacts of relays 992, 993, 994 and 995, the second set of break contacts from the bottom of relay 996 and the second set of operated contacts from the bottom of relay 997 and then through the second set of unoperated contacts from the bottom of relay 998, then over conductor 903 and then through the upper outer break contacts of relay 1512 to battery through the winding of relay 1513. Consequently, relay 1513 operates upon the satisfactory completion of the above-described checking circuit.

If anyone or more of the relays assumed above to be operated fails to operate and no relay operates in place of any such relay, then the above-described checking circuit from ground 909 will not be complete so that no translation will be furnished. If however, the proper number of relays in each group is operated then relay 1513 operates in the manner described above. If more than the desired number of relays operate then ground is applied to the conductor 904 instead of to the winding of relay 1315. For example, if relays 960, 961 and 962 are all operated, then the circuit extends from ground 909 through the upper outer contacts of relay 960, the upper inner operated contacts of relay 961 and through the third set of operated contacts from the bottom of relay 962 to conductor 904, which conductor extends to the decoder circuit through operated contacts of relay 2211 to indicate to the decoder that the dialed signals have not been properly received or entered in the translating arrangement described herein. The decoder or sender will then make another attempt to properly operate the relays and indicate a trouble condition at the test desk or other convenient location.

Assume now that the code has been properly received so that relay 1513 operates. Relay 1513 in operating applies ground to conductor 2215 extending to the decoder indicating that the input codes have been properly received and registered in the input circuit to the translating equipment in accordance with the exemplary embodiment described herein. The operation of relay 1513 as described above applies ground from the upper outer break contacts of relay 1514 and the lower inner operated contacts of relay 1513 to the conductor 2214 extending to the decoder circuit through contacts of relay 2211. Operation of relay 1513 also applies battery through the register relays such as 1515 to the anodes of the output tubes of the gate and output amplifier circuits represented in FIG. 11 thus energizing the output circuits of these amplifiers so that they will repeat the information applied on their inputs. The operation of relay 1513 also extends a locking circuit through the lower operated contacts of relay 999.

The operation of relay 1513 also applies ground to the start conductor 1422 of the start circuit shown in FIG. 14 which ground causes a positive pulse to be applied to the grid of the left-hand sections of tubes 1420 and 1424 in the manner described hereinbefore. As a result, positive voltage is applied to the conductor 1441 from the start circuit to the lower terminal of diode 1415 in response to the next succeeding "B" pulse received over conductor 886 following the operation of relay 1513.

During the next revolution therefore the circuits will be searching for a match between the input information or address codes and the corresponding information stored in the address space of each of the translations recorded in the magnetic material of the magnetic drum. For example, relays 510, 511, 512, 514 and 519 are arranged to apply ground to the conductors A0, A1, A2, A4 and A7 extending to the match circuit 610 shown in FIG. 6. In substantially the same manner as described hereinbefore with respect to the match circuit shown at the bottom of FIG. 10, when voltages representing "ones" or "X's" applied to the conductors AD41, AD42, AD43, AD44 and AD45 by the amplifiers DA41 through DA45 under control of the pickup heads 41, 42, 43, 44 and 45 located adjacent to the drum, match or correspond with the grounds applied to the conductors A0, A1, A2, A4 and A7 by and under control of the address information the address match circuit 610 causes a positive voltage to be applied to the output lead in substantially the same manner as described hereinbefore. Likewise, each of the other match circuits operate in a similar manner to cause a positive output voltage to be applied to their output leads and terminals when the voltages which are applied to the match circuit from the drum circuit correspond to or match the grounds applied to the input leads from the respective relay contacts of the corresponding code address relays. Thus each time during a revolution a match is obtained on any of these gate match circuits 610, 620, 630, 640, 1050, 1060, 1070 and 1090, an output voltage is applied to the output circuit of each of said circuits. When all of these output voltages are simultaneously positive in response to a match being obtained between the input address code and the corresponding address code stored on the drum, positive voltage will be applied to the grid of the address combining tube 1413. Each one of the diodes 1418 is so connected that the lowest voltage applied to their right-hand terminals controls the voltage applied to the grid of tube 1413. Thus so long as any one or more of these diodes 1418 has substantial ground potential applied to its right-hand terminal the grid of tube 1413 is maintained at a sufficiently low voltage so that the tube will not conduct appreciable current. However, upon the simultaneous application of positive voltages to all of these diodes, the left-hand terminals of these diodes rise to a relatively high positive value which voltage is transmitted through the diode 1412 to the control grid of tube 1413. The output of tube 1413 is likewise positive and conveyed to the right-hand terminal of diode 1416.

Assume that the translation in question is a bona fide translation and available for use. Under these circumstances, a positive pulse is also obtained from the output circuit of the control match circuit 1090, FIG. 10. This positive pulse is obtained in substantially the same manner as described hereinbefore and is applied to the conductor 1011 extending to the right-hand terminal of diode 1417. Thus as the address including the control address of the desired translation approaches the pickup heads adjacent to the drum, a positive voltage is applied to the right-hand terminals of diodes 1417 and 1416. In addition the lower terminal of diode 1415 has a positive voltage applied to it from conductor 1441 as described herein. These diodes are connected to the grid of tube 1414 to form an "and" circuit with the result that when a positive voltage is applied to the above-identified terminals of all of these diodes a positive voltage is also applied to the grid of tube 1414 with the result that a positive voltage is applied across the output cathode resistor 1444 and thus to the output conductor 1443 extending to the left-hand terminal of diode 710. The positive voltage applied to this diode persists for a sufficiently long time so that it will be positive when the "A" pulse from conductor 866 is applied to resistor 722 and the coupling condenser 724. This "A" pulse is applied to these conductors at approximately the time the center of the cell or slot having the input address recorded therein as well as output translation section 303 and the control section 306 pass under the center of the pickup coils. The application of the "A" pulses to the resistor 722 at a time, when the left-hand terminal of diode 710 is also positive, applies a positive voltage to the grid of tube 712 with the result that an output pulse is repeated across the cathode resistor 740 forming in part the output circuit of tube 712. This output extends to a number of circuits. It extends through the coupling condenser 722 to the left-hand grid of the driver tube 718 for controlling the writing as described hereinbefore. However, inasmuch as these circuits are for writing or recording, the operation of tube 718 in response to the pulse transmitted through condenser 722 performs no useful function at this time.

The application of the "A" output pulse from tube 712 through the coupling condenser 725 to the grids of tube 715 causes the conduction within sections of tube 715 to reverse, as described above, with the result that a positive voltage is applied to the left-hand terminal of diode 711. This voltage will be present when the next succeeding "B" pulse is applied to conductor 886 which is at the time that the slots in which the output translation information recorded in sections 304 and 305 are substantially centered under the combined pickup and recording heads.

The selected "A" pulse output from tube 712 is also applied over conductor 733 to the gate and output amplifier circuits 1101A, 1132A, as well as all of the other intermediate "A" output amplifiers indicated but not actually shown in FIG. 11, there being an "A" output gate and amplifier and a "B" output gate and amplifier for each of the operating pickup devices 1 through 32 and a "B" output gate and amplifier for each of the operating pickup devices 41 through 78. Additional equipment may be provided for the other pickup heads when and if desired.

Each of these gate and output amplifiers are substantially the same as shown in detail for the gate and output amplifier 1101A. The selected "A" pulse from tube 712 is applied over conductor 733 to one input of this circuit and the output of the first recording and pickup device associated with the first track or channel of the drum is applied over conductor AD1 from the output amplifier 312 connected to the first pickup head No. 1. Conductor AD1 extends to the left-hand terminal of diode 1140.

The circuits of the gate and output amplifier are substantially the same as the circuits shown at the top of FIG. 16. The circuit comprises a single cycle multivibrator circuit connected to both sections of tube 1142 and an output tube 1143. The circuits of the single cycle multivibrator comprising tube 1142 are arranged so that the right-hand section is normally conducting and upon the application of a positive pulse through the coupling condenser 1144 and the diode 1141 to the left-hand grid of tube 1142 conduction through the left-hand section of this tube is initiated and conduction to the right-hand section is interrupted. Thereafter conduction continues through the left-hand section for a period of time sufficiently long to operate the relay 1515 in the output circuit of the output tube 1143. As a result relay 1515 operates in a circuit extending from battery through the center set of lower operated contacts of relay 1513, the center set of upper unoperated contacts of relay 1514, resistor 1516, the winding of relay 1515, and the anode of tube 1143 to ground on the cathode of this tube. Thus, the single cycle multivibrator circuit 1142 responds to a relatively short duration of the order of several microseconds and causes a sufficiently long output pulse to be obtained from the output tube 1143 to actuate the relay 1515.

However, a positive pulse is applied to the left-hand grid of tube 1142 only when the selected "A" pulse is received over conductor 733 and the output of the amplifier 312 is positive indicating that a one previously recorded on the drum in the slot under the first pickup head is at this time passing under the pickup head adjacent the first track or channel on the drum. Thus a positive pulse has to exist simultaneously on both of the conductors 733 and AD1 to cause a positive voltage to be applied to the left-hand grid of tube 1142. If the output of the amplifier over conductor AD1 is not positive the low forward resistance of the diode 1140 will substantially shunt or short-circuit the applied pulses over conductor 733 so these pulses will be of no avail. However, when the output of the amplifier 312 is positive a positive pulse is applied to conductor AD1, then upon the application of the selected "A" pulse to conductor 733 a positive voltage is applied to the grid of tube 1142 with the result that the left-hand section becomes conducting.

The grid of tube 1143 is also conected to the grid of the left-hand section of tube 1142 with the result that this also becomes positive if a one is recorded in the first cell of track 1 in area 303 on the drum of the translation in question, and as a result anode current flows in the output circuit of tube 1143 which current causes relay 1515 to operate.

Relay 1515 in operating as described above applies a locking ground through its operated contacts and winding and then through the center set of upper break contacts of relay 1514, the lower center set of operated contacts of relay 1513 to battery. This locking ground effectively short-circuits the tube 1143 so that this tube need conduct current only during the operate time of relay 1515. Relay 1515 in operating also completes an output circuit for operating the output relay 1551 which relay in turn applies ground to one of the conductors extending to the decoder over which the output information is supplied to the decoder.

Similar output grounds will be applied to the other decoder leads in a similar manner in accordance with the other information recorded in the area 303 on the drum. It is noted that the ground connected to these output leads is maintained under control of relays 1514 and 1513. Thus approximately a third of the output information is obtained as section 303 passes under the pickup devices simultaneously with the passing of the address in section 302 of the drum under the corresponding pickup coils. All of the above-described information is obtained as a result of the selected "A" pulse being applied to the circuits as described above.

The succeeding "B" pulse obtained over conductor 732 from the output of tube 713 is likewise applied to the control grid of tube 719. This tube is employed to write or record in the areas 304 and 305 in the manner described above. However, under the assumed circumstances the circuits are not conditioned for writing so that the application of the selected "B" pulse to this tube performs no useful function at this time. The selected "B" pulse however is also applied to the "B" gate and output amplifiers, such as 1101B, 1132B through 1122 as indicated in FIG. 11. As a result, an output is obtained from each of these gate and output amplifiers when a one is recorded in the cell of the translation item controlling the respective amplifier. As a result, the output leads to the decoder are grounded in response to a one being recorded in the cell assigned to control that particular output and no ground is applied to the lead when a zero is recorded in the cell for that lead for the translation in question. The selected "B" output pulse over conductor 732 also extends to the starting control circuits shown in FIG. 14 and is applied to the right-hand terminal of the condenser 1445 with the result that the circuits of tube 1430 are restored to their initial condition so that they will be ready to respond to another requested translation at a later time.

The decoder upon receiving the translated information from the translation circuit will apply ground to conductor 2216 which extends through the operated contacts of relay 2212 to the winding of relay 1514. Relay 1514 operates and applies ground to conductor 2217 extending to the decoder and indicates that the reset relay 1514 has operated. This relay 1514 locks operated in an obvious circuit under control of all of the code relays of FIGS. 5 and 9. Thus, relay 1514 remains operated until all of the code relays have been released by the decoder. The operation of relay 1514 interrupts the locking circuits of relay 1515 and the other register relays for supplying output information. As a result, the output relays 1551 through 1557 as well as all of the other output relays not actually shown but merely indicated by FIG. 15 are released. The operation of relay 1514 also removes ground from conductor 2214 extending to the decoder circuit.

Upon the release of the address code relays of FIGS. 5 and 9 the above-described checking circuit for operating relay 1513 is interrupted whereupon relay 1513 releases and restores the start circuit and other circuits to their initial condition so that the circuits will be available to furnish another translation when requested. The release of all of the address code relays of FIGS. 5 and 9 also interrupt the locking circuit of relay 1514 thus permitting this relay to release and in turn returning the translating circuits to their initial condition.

It is to be noted that during the time the translation is obtained from any one of the input-output circuits associated with any one of the decoders other translations may be simultaneously obtained from other input-output circuits from the same drum and supplied to other decoder circuits. The manner of connecting these various additional circuits is shown in FIG. 2 where the input-output circuits 221, 222 and 223 are all shown connected in parallel to the output amplifiers 213, 214 and 215.

Thus, the drum translator equipment in accordance with the exemplary embodiment described herein responds to the same signals as the card translator in the above-identified application and in addition supplies substantially the same type of signals to the decoder as supplied by the card translator of said above-identified application. Thus, the magnetic drum circuits in accordance with this invention may be substituted for the card translators disclosed in said above-identified application. In addition, the translation to be performed may be readily and rapidly changed to permit rerouting traffic when desired.

As described above, each time ground is applied to conductor 1422 positive pulse is applied to the left-hand grid of tube 1424 in addition to a positive pulse applied to the left-hand grid of tube 1420. The two sections of tube 1424 are connected in a single cycle multivibrator circuit in which the right-hand section is normally conducting. On the application of a positive pulse to the left-hand grid of this tube conduction of current by the left-hand section is initiated and this in turn causes the current flowing through the right-hand secion to be interrupted. The circuits of this tube are so arranged that at the end of a predetermined interval of time thereafter, which in an exemplary embodiment of this invention is forty-five milliseconds, the charge on condenser 1450 will have changed so that a discharge will again be initiated through the right-hand section of this tube.

In the above-described operation of the system, it has been assumed that a translation address has been found and a translation obtained or else the translation or recording address obtained and the desired information entered in the drum circuit prior to the expiration of the forty-five milliseconds. Consequently, a positive pulse was obtained over conductor 732 prior to this time which pulse was differentiated by and transmitted through the condenser 1445. The trailing edge of this pulse was employed to restore the circuits of tube 1430 to normal so that the equipment would be ready to respond to another request for the translation or to another recording or altering of translation items in the drum.

For the purpose of illustration, assume now that for one reason or another a match has not been obtained between the address of a translation on the drum and the address of a desired translation incoming from a decoder. Under these circumstances a pulse will not be obtained over conductor 732 prior to the expiration of the forty-five milliseconds. Upon the expiration of this forty-five milliseconds, conduction is again established through the right-hand section of tube 1424 and the discharge flowing through the left-hand section interrupted. As a result, the grid of the right-hand section of tube 1424 and the grid of the left-hand section of tube 1426 will become more positive and as a result, the anode of the left-hand section of tube 1426 becomes more negative. This more negative voltage is applied to the grid of the right-hand section of tube 1426. This negative voltage is repeated by the cathode of this section and applied through the diode 1428 and coupling condenser 1427 to the anode of the right-hand section of tube 1430 and the grid of the left-hand section of this tube. As a result, the discharge flowing through the left-hand section of this tube is interrupted and the control circuits shown in FIG. 14 restored to their initial condition where they are ready for performing or attempting to perform another translation.

Meantime, the circuits of the decoder, upon failing to receive a translation within a prescribed time, will also time out and either give an alarm indication or cause another attempt to be made to obtain the desired translation or the decoder circuit may be arranged to perform both these functions. On the second attempt, if the failure of the first one was due to some stray voltage or field, circuits may operate satisfactorily to supply the desired translation. If they fail to supply the desired translation, the decoder circuits will usually be arranged to give an alarm indication and probably a busy indication to the calling party so that the calling party will make another call.

It is to be understood that the above-described arrangements are illustrative of an application of the principles of this invention. Numerous other arrangements and modifications may be devised by those skilled in the art without departing from the spirit and scope of the invention.

What is claimed is:

1. In a telephone switching system, a translating device comprising a continuously moving carrier, a plurality of pickup and recording devices located adjacent said continuously moving carrier, means including a plurality of said recording and pickup devices for recording codes of called stations in areas on said carrier, apparatus for recording routing information for each of said codes in areas adjacent said codes on said carrier, additional means for recording additional control codes adjacent said codes of called stations for rendering said codes and said routing information available, and means jointly responsive to said codes of called stations and said auxiliary codes for conveying said routing information from said carrier.

2. In a telephone switching system a translating device comprising a signal storage carrier, means for continuously moving said carrier, a plurality of recording devices located adjacent said carrier, a plurality of pickup devices located adjacent said carrier, means for recording codes of called stations in areas of said carrier which substantially simultaneously pass under said pickup devices, other means for recording routing information in other areas of said carrier which areas also substantially simultaneously pass under other pickup coils substantially simultaneously with the passing of said codes under said pickup coils, and means for recording other routing information in areas of said carrier immediately adjacent in a direction of movement of said carrier to said called station codes, means responsive to said called station codes for deriving said routing information in the immediately adjacent areas from the same pickup coil.

3. In a telephone switching system a translating device comprising a signal storage carrier, means for continuously moving said carrier, a plurality of recording devices located adjacent said carrier, a plurality of pickup devices located adjacent said carrier, means for recording codes of called stations in areas of said carrier which substantially simultaneously pass under said pickup devices, other means for recording routing information in other areas of said carrier which areas also pass under other pickup coils substantially simultaneously with the passing of said codes under said pickup coils, means for recording other routing information in areas of said carrier immediately adjacent in a direction of movement of said carrier to said called station codes, means responsive to said called station codes for deriving said routing information in the immediately adjacent areas from the same pickup coil, and means for recording auxiliary control codes in areas of said carrier which pass under pickup coils substantially simultaneously with the areas of said called station code and means responsive to predetermined auxiliary codes recorded in said auxiliary area for preventing the routing information adjacent said called station codes from being conveyed from said continuously moving carrier.

4. In a telephone switching system a translating device comprising a continuously rotating cylinder of magnetic material which magnetic material has permanent magnet properties, a plurality of pickup and recording devices located adjacent said continuously rotating cylinder, means for deriving a first series of synchronizing pulses, other means for deriving a second series of synchronizing pulses interleaved with the first series of pulses, selecting means for selecting first a pulse of said first series of synchronizing pulses and other means for selecting the next succeeding pulse of other series of pulses and control circuits controlled by said two selected pulses, an output circuit for said device, and control means responsive to said two synchronizing pulses for applying signals to said output circuit under control of two adjacent areas of said surface of said cylinder.

5. In a telephone switching system a translating device comprising a continuously rotating cylinder of magnetic material which magnetic material has permanent magnet properties, a plurality of pickup and recording devices located adjacent said continuously rotating cylinder, apparatus including said recording and pickup devices for recording codes in an area of said cylinder which passes under a plurality of said pickup and recording devices, additional means for initially magnetizing the surface of said cylinder in a predetermined manner, and means responsive to said predetermined manner of magnetization for controlling the recording of signals by said recording and pickup devices.

6. In a telephone switching system a translating device comprising a continuously rotating cylinder of magnetic material which magnetic material has permanent magnet properties, a plurality of pickup and recording devices located adjacent said continuously rotating cylinder, apparatus including said recording and pickup devices for recording codes in an area of said cylinder which passes under a plurality of said pickup and recording devices, additional means for initially magnetizing the surface of said cylinder in a predetermined manner, means responsive to said predetermined manner of magnetization for controlling the recording of signals by said recording and pickup devices, and means for restoring a portion of said magnetic surface to said initial condition when it is no longer desired to employ the information recorded in said areas.

7. In a telephone switching system a translating device comprising a continuously moving carrier, a plurality of pickup and recording devices located adjacent said continuously moving carrier for recording signals on said carrier, means for controlling said pickup and recording devices to record translation information signals in predetermined areas of said carrier, other means for recording control codes individual to each of said areas of a translation item, means for recording a code in said control area indicating an unused translation area and means responsive to said code recorded in said control area for preventing use of information stored in the translation area individual thereto.

8. In a telephone switching system a translating device comprising a continuously moving carrier, a plurality of pickup and recording devices located adjacent said continuously moving carrier for recording signals on said carrier, means for controlling said pickup and recording devices to record translation information signals in predetermined areas of said carrier, other means for recording control codes individual to each of said areas of a translation item, means for recording a code in said control area indicating an unused translation area, and apparatus responsive to any one of said control codes designating an unused translation area for changing said control code to permit translation information signals to be recorded in the translation area individual to said control code.

9. In a telephone switching system a translating device comprising a signal storage carrier, means for continuously moving said signal storage carrier, a plurality of recording and pickup devices located adjacent said carrier, means for recording codes of called stations in areas of said carrier which substantially simultaneously pass under said pickup devices, other means for recording routing information in other areas of said carrier which other areas also substantially simultaneously pass under other pickup coils substantially simultaneously with the passing of said called station codes under said pickup coils, amplifying means individual to each of said pickup coils, a plurality of decoder circuits for obtaining translations from said translating device, control circuits individually interconnecting each of said decoders and said amplifier means for substantially simultaneously obtaining translations from said translating device.

10. In a storage device a continuously rotating cylinder of magnetic material having permanent magnet properties, means for storing signals responsive to items of information in predetermined areas of said drum, other means for storing identifying signals in said areas, input means responsive to input codes, a match circuit responsive to said input codes and said identifying codes stored in said drum, said match circuit including a plurality of diodes to which are connected one or the other of two different voltage conditions, and coincidence indicating means responsive to a voltage midway between said two potential conditions applied to said match circuits.

11. In a signal storage device in combination output means including output terminals to which one or the other of two voltage conditions are applied by said storage means, input means comprising a similar plurality of terminals to which two different potential conditions are also applied, a match indicating device having interconnection means including a unilateral conducting device and connected between corresponding ones of said input terminals and said output terminals and responsive to and only responsive to a predetermined voltage condition between said two voltage conditions.

12. In a storage device, a continuously rotating cylinder of magnetic material having permanent magnetic properties, means for storing information signal groups representing items of information in predetermined areas of said cylinder, other means for storing identifying signal groups in said areas, input means responsive to input signal groups, a match circuit responsive to said input signal groups and said identifying signal groups stored in said cylinder, said match circuit including a plurality of diodes, means responsive to each signal of said input signal groups for applying one or the other of two potential conditions to said match circuit, means responsive to each signal of said stored identifying signal groups for applying one or another of two different potential conditions to said match circuit, and responsive means connected in said match circuit responsive to and only responsive to a predetermined voltage condition between each of said two potential conditions applied to said match circuit for all the signals of a signal group.

13. In a telephone switching system a magnetic translation device comprising a continuously rotating cylinder of magnetic material which magnetic material has permanent magnetic properties and two sources of synchronizing pulses in which the pulses of one of said sources are interspersed with the pulses of the other of said sources, means controlled by the first of said sources of synchronizing pulses for recording and reading codes of called telephone stations, and means controlled by pulses from the other of said sources for recording and reading translated routing information for directing calls over paths to the stations designated by the said codes.

14. Translating equipment for automatic switching systems exemplified by automatic telephone exchanges, employing an information storage device adapted for the storage at different addresses thereon of digital translation information corresponding to different codes, means for receiving from a register-sender separate from said equipment a code registered therein for which translation is required, and means responsive to such a registered code as received by the translation equipment for selecting the address on the storage device at which the appropriate translation information is stored and for sending such information back to the register-sender.

References Cited in the file of this patent

UNITED STATES PATENTS

| | | |
|---|---|---|
| 2,614,169 | Cohen et al. | Oct. 14, 1952 |
| 2,617,704 | Mallina | Nov. 11, 1952 |
| 2,668,875 | Shepherd | Feb. 4, 1954 |
| 2,675,427 | Newby | Apr. 13, 1954 |
| 2,679,551 | Newby | May 25, 1954 |
| 2,680,155 | Molnar | June 1, 1954 |
| 2,723,311 | Malthaner | Nov. 8, 1955 |
| 2,739,299 | Burkhart | Mar. 20, 1956 |
| 2,764,634 | Brooks et al. | Sept. 25, 1956 |
| 2,769,592 | Burkhart et al. | Nov. 6, 1956 |
| 2,782,256 | Malthaner | Feb. 19, 1957 |
| 2,805,286 | Baker | Sept. 3, 1957 |
| 2,891,113 | Flood | June 16, 1959 |